United States Patent
Dunmead et al.

(10) Patent No.: US 6,689,191 B2
(45) Date of Patent: Feb. 10, 2004

(54) RAPID CONVERSION OF METAL-CONTAINING COMPOUNDS TO FORM METALS OR METAL ALLOYS

(75) Inventors: Stephen Dunmead, Raleigh, NC (US); Kauko Johannes Karpale, Ulvila (FI); Alan W. Weimer, Niwot, CO (US); Karen J. Buechler, Westminster, CO (US); Jacob A. Johnson, Roscoe, IL (US)

(73) Assignees: OMG Americas, Inc., Cleveland, OH (US); The Regents of the University of Colorado, Boulder, CO (US)

( * ) Notice: Subject to any disclaimer, the term of this patent is extended or adjusted under 35 U.S.C. 154(b) by 0 days.

(21) Appl. No.: 09/791,275

(22) Filed: Feb. 22, 2001

(65) Prior Publication Data

US 2003/0019328 A1 Jan. 30, 2003

Related U.S. Application Data

(60) Provisional application No. 60/202,305, filed on May 5, 2000, and provisional application No. 60/184,029, filed on Feb. 22, 2000.

(51) Int. Cl.$^7$ .................................................. B22F 9/24
(52) U.S. Cl. .............................. 75/336; 75/351; 75/369
(58) Field of Search .......................... 75/335, 336, 351, 75/363, 369

(56) References Cited

U.S. PATENT DOCUMENTS

| | | | |
|---|---|---|---|
| 3,933,434 A | 1/1976 | Matovich | 23/252 |
| 4,024,234 A | 5/1977 | Monks et al. | 424/1 |
| 4,044,117 A | 8/1977 | Matovich | 423/659 |
| 4,844,736 A | 7/1989 | Shimo et al. | 75/0.5 B |
| 5,110,565 A | 5/1992 | Weimer et al. | 422/198 |
| 5,190,737 A | 3/1993 | Weimer et al. | 423/345 |
| 5,194,234 A | 3/1993 | Weimer et al. | 423/297 |
| 5,221,322 A | 6/1993 | Tokuoka et al. | 75/346 |
| 5,340,417 A | 8/1994 | Weimer et al. | 148/513 |
| 5,380,688 A | 1/1995 | Dunmead et al. | 501/87 |
| 5,707,419 A | 1/1998 | Tsantrizos et al. | 75/336 |
| 5,746,803 A | 5/1998 | Dunmead et al. | 75/351 |
| 5,756,410 A | 5/1998 | Dunmead et al. | 501/96 |
| 5,788,738 A | 8/1998 | Pirzada et al. | 75/331 |
| 5,851,507 A | 12/1998 | Pirzada et al. | 423/659 |
| 5,976,217 A | 11/1999 | Kneringer et al. | 75/353 |
| 6,126,712 A | * 10/2000 | Hohne et al. | 75/369 |

OTHER PUBLICATIONS

A.W. Weimer et al., "Kinetics of Carbothermal Reduction Synthesis of Beta Silicon Carbide," *AICLE Journal*, vol. 39, No. 3 (Mar. 1993).

* cited by examiner

Primary Examiner—George Wyszomierski
(74) Attorney, Agent, or Firm—Kalow & Springut LLP

(57) ABSTRACT

A method of converting metal-containing or metal alloy-containing compounds into a metal or metal alloy by rapidly heating the metal-containing or metal alloy-containing compound to an elevated temperature to instigate conversion and holding the metal-containing or metal alloy-containing compound at the elevated temperature for a time sufficient to effect formation of the metal or metal alloy is an efficient and economical method of producing metals and metal alloys.

19 Claims, 3 Drawing Sheets

RAPID CONVERSION OF METAL-CONTAINING COMPOUNDS TO FORM METALS OR METAL ALLOYS

CROSS REFERENCE TO RELATED APPLICATIONS

This application claims the benefit of U.S. Provisional Application No. 60/184,029 filed Feb. 22, 2000, and U.S. Provisional Application No. 60/202,305 filed May 5, 2000.

BACKGROUND OF THE INVENTION

The present invention provides an economical, rapid and efficient method for making metal and metal oxide powders.

Metals and metal oxide powders enjoy a multitude of applications. For example, metals and metal oxide powders are suitable for use in the application fields of powder metallurgy, catalysts, hardmetals, electrochemical devices (including batteries, capacitors, photovoltaics, sensors and fuel cells), metal matrix composites, chemicals (such as electroplating and as raw materials for metal-organic compositions), magnetic compositions, polymer fillers, pigments, optical absorbers, metal injection-molding, electrical and magnetic shielding, display materials, precursors for thin and thick film applications, thermal spray, electronics (including conductors and dielectrics), ceramics, integrated circuits, and brazing alloys, among others.

Metals and metal oxide powders commonly are manufactured by decomposing, oxidizing or reducing a metal carbonate, hydroxide or oxide, or other metal-containing compound. The basic mechanisms and kinetics of these reactions generally are well established. Conventional conversion of metal-containing compounds to metals and metal-oxides typically are carried out in pusher, strip-belt, rotary, or fluidized bed reactors. To achieve complete conversion, the reactants typically require a residence time on the order of hours.

For example, the conversion of cobalt hydroxide by decomposition and hydrogen reduction to form cobalt conventionally requires a residence time of from one to two hours at a temperature of 500 to 800° C. in a strip belt or pusher reactor. The conversion of cupric hydroxide to cupric oxide by decomposition and oxidation in a strip-belt or pusher reactor requires a residence time of from one to three hours at a temperature of 150 to 800° C.

A variety of alternative methods of forming metals and metal oxides from metal-containing compounds have been proposed. For example, the formation of metallic powders by plasma vaporization of inorganic compounds is disclosed in U.S. Pat. Nos. 5,788,738, and 5,851,507.

Though plasma vaporization and similar methods are scientifically interesting, the expense of required equipment and the low production rates of these methods make them unsuitable for large-scale commercial application.

It has been taught that carbothermal reduction of metal-containing compounds to form metallic carbides and nitrides may be conducted at rapid heating rates. For example, U.S. Pat. No. 5,194,234 describes a carbothermal reduction method of forming fine powdered boron carbide by reacting a mixture of boric oxide or hydrate and a carbon source at a temperature above about 1400° C. and cooling the resultant product. In the method it is preferred to heat the reaction mixture at a rate equal to or exceeding 1000° C./second.

U.S. Pat. Nos. 5,190,737 and 5,340,417 disclose methods of preparing silicon carbide by carbothermal reduction involving heating a mixture of a silica source and a carbon source at a heating rate at least about 100° C./second. U.S. Pat. Nos. 5,380,688 and 5,746,803 disclose methods employing rapid carbothermal reduction which involve heating reactants at rates from 100° C. to 100,000,000° C./second to from metallic carbides. And U.S. Pat. No. 5,756,410 discloses a method of forming metal carbonitrides which method includes heating reactants at rates from 100° C. to 100,000,000° C./second.

However, the effective use of rapid heating rates and short residence times in the conversion of metal-containing compounds into metals and metal oxides has not been shown.

SUMMARY OF THE INVENTION

This invention is a method for converting a metal-containing compound into the metal or an oxide of the metal of the metal-containing compound, which comprises heating the metal-containing compound at a rate between about 100° C./second to about 100,000,000° C./second to an elevated temperature that makes conversion of the metal-containing compound thermodynamically favorable, and holding the metal-containing compound at the elevated temperature for a residence time sufficient to substantially convert the metal-containing compound into at least one product selected from the group consisting of (i) the metal and (ii) oxides of the metal.

The present invention is based on the discovery that the kinetics of conventional methods of converting metal-containing compounds to metals and metal-oxides—such as decomposition, oxidation and reduction—are much faster than previously known. By rapidly heating a metal-containing compound, it has been found, the compound may be converted to metal or metal-oxide in seconds or fractions of seconds. The lengthy, hours-long reactor residence times of convention have been overcome by the present invention.

Thus, a method of producing metals and metal oxides efficiently at a high production rate at relatively low cost is provided by the present invention.

Typical reactions useful in the practice of this invention for converting a metal-containing compound into the metal or an oxide of the metal of the metal-containing compound include decomposition, oxidation, reduction, substantially simultaneous decomposition and reduction, and substantially simultaneous decomposition and oxidation. Accordingly, embodiments of this invention include the methods for (1) decomposing a metal-containing compound to produce the metal or an oxide of the metal of the metal-containing compound, (2) reducing a metal-containing compound to produce the metal or an oxide of the metal of the metal-containing compound, (3) oxidizing a metal-containing compound to produce the metal or an oxide of the metal of the metal-containing compound, (4) substantially simultaneously decomposing and reducing a metal-containing compound to produce the metal or an oxide of the metal of the metal-containing compound, and (5) substantially simultaneous decomposing and oxidizing a metal-containing compound to produce the metal or an oxide of the metal of the metal-containing compound; all of which methods comprise heating the metal-containing compound at a rate of between about 100° C./second to about 100,000,000° C./second to an elevated temperature that makes conversion of the metal-containing compound thermodynamically favorable and holding the metal-containing compound at the elevated temperature for a residence time sufficient to substantially convert the metal-containing compound into at least one product selected from the group consisting of (i) the metal and (ii) oxides of the metal.

In practicing the present invention, some metal and metal oxides may be produced by a two-step process. In step one, the metal-containing compound undergoes conversion to a "precursor" metal-containing compound in which conversion is not substantially complete. In step two (the finishing step), the product from step 1 is heated for a second time at a temperature sufficient to form the final metal or metal oxide product. This two-step process is not needed in all cases, but may be used when necessary or desired. The second heat treatment may be carried out using the technology of the present invention or may be carried out using conventional methods.

In addition, the present invention may be practiced by first converting a metal-containing compound to the metal ("precursor") of the metal-containing compound, then in a second step, converting the metal to an oxide of the metal. Also, the present invention may be practiced by first converting a metal-containing compound to a first (precursor) oxide of the metal of the metal-containing compound, then in a second step converting the precursor metal oxide into the metal or a second, different oxide of the metal of the metal-containing compound.

DETAILED DESCRIPTION OF THE INVENTION

Figure 1:
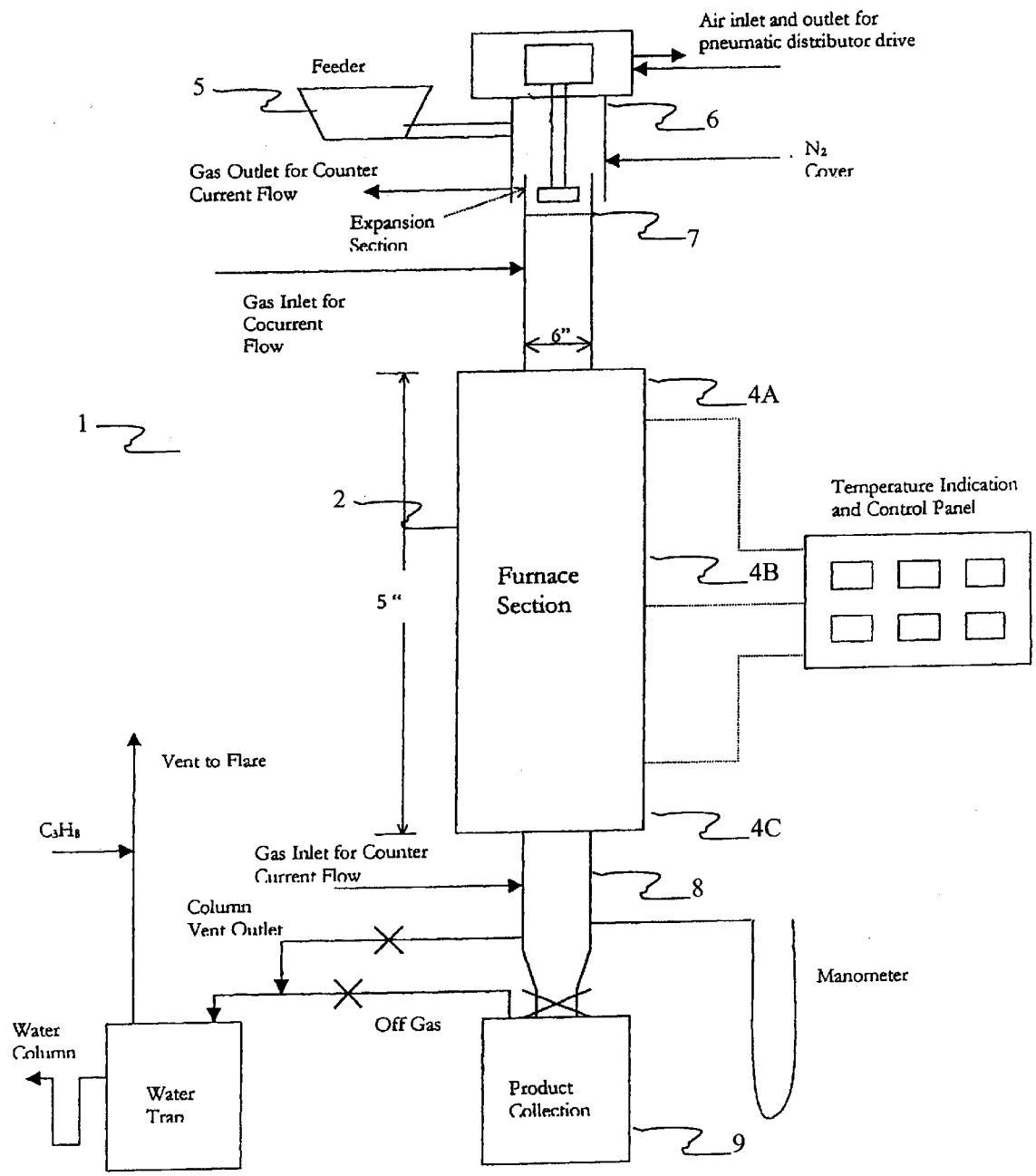
FIG. 1 is a schematic of a vertical transport reactor that is particularly useful for carrying out the present invention.

The method of the present invention may be employed suitably to convert a metal-containing compound to produce the metal or an oxide of the metal of the metal-containing compound. The mechanism of conversion is preferably thermal decomposition, oxidation, or reduction. Thermal decomposition can substantially accompany oxidation or reduction, and thus these two (combination) reactions are also preferred mechanisms for converting a metal-containing compound into the metal or metal oxide in accordance with the present invention.

The method may be employed using virtually any metal-containing compound commercially available to form virtually any commercially important metal or metal oxide. Due to the commercial availability of compounds containing them, and to the commercial market for them, it is preferred to employ the present invention to manufacture the metals copper, iron, nickel, cobalt (and other Group VIIIB metals); tungsten or titanium (and other transition metals: tantalum, molybdenum, zirconium, hafnium, vanadium, niobium and chromium), lithium, magnesium, zinc, aluminum, gallium, germanium, indium, tin, lead, yttrium, scandium, cerium, neodymium and lanthanum. Particularly preferred is the use of the present invention to produce metal powders of cobalt, nickel, copper and tungsten.

The method of this invention also may be employed to produce metal oxides, Again because of their commercial value, it is preferred to employ the invention to form oxides of copper, tungsten and molybdenum. Particularly preferred is the manufacture of cobalt oxide and nickel oxide.

The invention is suitable as well to produce a mixture of two or more metals, a mixture of two or more metal oxides, a mixture of a metal and one or more of its oxides, and a mixture of a metal and an oxide of another metal. Preferred are lithium cobalt dioxide and cobalt-nickel oxide.

Further, the method may be employed suitably to form alloys of two or more metals, oxides of alloys, or a mixture of alloys. Preferred are cobalt-chromium, cobalt-vanadium and cobalt-iron-nickel, iron-nickel, bronze and brass.

The metal-containing compound may be any compound comprised of at least the metal of the desired metal or metal oxide product. Included, without limitation, are metal oxides, carbonates, hydroxides, oxalates, acetates and salts. Among these, preferred are hydroxides, carbonates and oxides.

Generally it is not preferred to use a metal halide as the metal-containing compound in the present invention. Metal halides such as $CoCl_2$ may produce gaseous byproducts that are acidic and pose environmental concerns.

Suitable metal-containing compounds also include compounds containing two or more metals, including for example, nickel-cobalt oxide and cobalt-chromium hydroxide, which are preferred.

The metal-containing compound also may comprise a mixture of compounds having different metals when the desired product is a mixture of metals, a metal alloy, a mixture of metal oxides or a mixed metal oxide.

Accordingly, preferred metal-containing compounds for use in (and the preferred conversions they undergo, in the present invention include:

Carbonates:
$3CoCO_3+Air=Co_3O_4+CO/CO_2$
$NiCO_3+C=Ni+CO/CO_2$
$3LiCO_3+Co_3O_4=LiCoO_2+CO/CO_2$
$CoCO_3+H_2=Co+CO_2+H_2O$
$CuCO_3+Air=CuO+CO_2$
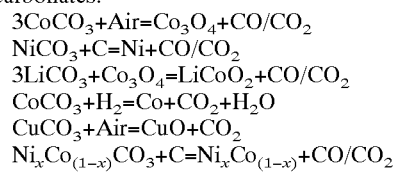

Hydroxides:
$3Co(OH)_2+Air=Co_3O_4+3H_2O$
$Co(OH)_2+H_2=Co+2H_2O$
$Co(OH)_2+Inert=CoO+H_2O$
$Cu(OH)_2=CuO+H_2O$
$Cu(OH)_2+H_2=Cu+2H_2O$ Oxalates:
$3CoC_2O_4*2H_2O+Air=Co_3O_4+6CO_2+6H_2O$
$CoC_2O_4*2H_2O+H_2=Co+2CO_2+2H_2O$
$CoC_2O_4*2H_2O+Inert=Co+2CO_2+2H_2O$ Salts:
Ammonium paratungstate+Air=$WO_3$+$NH_3$+$H_2O$ Metals:
$3Co+Air=Co_3O_4$
$Cu+Air=CuO/CuO_2$
$Ni+Air=NiO$ Oxides:
$Co_3O_4+4H_2=3Co+4H_2O$
$CoO+H_2=Co+H_2O$
$NiO+H_2=Ni+H_2O$
$CuO+H_2=Cu+H_2O$
$Cu_2O+H_2=2Cu+H2O$
$Co_3O_4+3LiCO_3=3LiCoO_2+CO/CO_2$
$Cu_2O+Air=2CuO$ The particles of the metal-containing compound are rapidly and preferably individually heated rapidly to an elevated temperature that makes conversion (e.g. decomposition, reduction or oxidation) of the metal-containing compound into the metal or metal oxide thermodynamically favorable.

The elevated temperature must be high enough such that the decomposition, oxidation or reduction reaction is thermodynamically favorable. The temperature also is preferably less than the melting point of any intended reaction product(s).

Thermodynamically minimum reaction temperatures for decomposing, oxidizing and reducing a given metal-containing compound to form a metal or metal oxide are readily calculatable, The minimum elevated temperature of the rapid conversion process is a temperature corresponding to a temperature where the Gibbs free energy of the reaction to form the most stable metal-containing compound employed in the reaction becomes negative.

For the purposes of the present invention, a thermal gradient may be employed in the hot zone of the reactor, if in the particular decomposition, oxidation or reduction it is determined that it is beneficial to run the reactor with the temperature set points not all being equal.

The heating rate for taking the metal-containing compound up to the elevated temperature and instigating its conversion is preferably at least on the order of about 100 to 10,000° C. per second and, optimally, on the order of about 10,000 to 100,000,000° C. per second. Most preferably the heating rate is from about 100,000 to 1,000,000° C. per second.

In part, the residence time of the metal-containing compound at the elevated temperature during the rapid thermal conversion process depends upon the heating rate and elevated temperature. Regardless of the temperature and heating rate, the residence time must be long enough to convert at least a major portion (i.e., greater than about 50% by weight) of the metal-containing compound. The residence time is preferably in the range of about 0.1 second to about 60 seconds, more preferably about 0.2 second to about 10 seconds, most preferably about 0.2 second to about 5 seconds; depending upon the heating method, heating rate, reaction temperature and the ultimate particle size desired. At higher temperatures, residence times substantially greater than 10 seconds may produce undesired sintered aggregates rather than particulate product. Whatever combination of reaction temperature, residence time and heating rate is selected, however, it should be adequate to convert the particular metal-containing compound into a product composed mainly of a metal or metal oxide.

The three factors of elevated temperature, residence time and heating rate also control the size of the particles obtained. They do so by affecting both the nucleation rate for forming the metal or metal oxide particles and the growth rate of these particles, once formed. For example, presuming that the particles are roughly spherical in shape and the conversion of starting material to product occurs at a relatively constant volume rate, the growth rate of the particles would be proportional to the cube root of the residence time. In order to minimize the particle size of the resulting metal or metal oxide powder, the elevated temperature, heating rate and residence time must be selected to yield a particle nucleation rate which is higher than, and preferably significantly higher than, the particle growth rate.

The heating method and apparatus employable in the practice of the present invention may be any type of heater and method known in the art for heating particulates to the reaction temperatures at heating rates in accordance with this invention. There are two preferred methods for rapidly heating the particles of the metal-containing compound. In one method, referred to herein as the "drop" method, particulate metal-containing compound is dropped into an already heated crucible that heats the particles at a rate of between about 100° C. per second to about 10,000° C. per second. In a second, more preferred, method, known herein as the "entrainment method," the particles of the metal-containing compound are entrained in an inert, oxidizing or reducing gas fed into a vertical reaction tube (VTR) furnace maintained at the reaction temperature, such as described in U.S. Pat. No. 5,110,565, incorporated herein by reference. The heating rate in the entrainment method is about 10,000° C. per second to about 100,000,000° C. per second. A. W. Weimer et al. describe the heating rate determination in "Kinetics of Carbothermal Reduction Synthesis of Beta Silicon Carbide," *AIChE Journal*, Vol. 39, No. 3 (March 1993), at pages 493–503. The teachings of this reference are incorporated herein by reference.

In the drop method, an induction furnace is brought to the desired reaction temperature and allowed to equilibrate for about 30 minutes. Aliquots of particles of the metal-containing compound are dropped into a crucible in the hot zone of the furnace. The extent of the reaction may be monitored, for example, by measuring the reactant by-product gas level in the crucible as a function of time.

The aliquot is, following conversion to the product or precursor, cooled as rapidly as possible back to a temperature sufficient to minimize particle agglomeration and grain growth. The drop method may be used as a predictor for results in the entrainment method. In addition, thermogravimetric analysis (TGA) can be used as a predictor of results for the entrainment and drop methods. In TGA, the weight loss of the metal-containing compound is followed as a function of time and temperature and the reaction rate can be compared to those of other materials known to react rapidly in the entrainment or drop modes.

In the preferred entrainment method, the metal-containing compound has an average residence time in the vertical reaction tube furnace of from about 0.1 to about 60 seconds, preferably from about 0.2 to 10 seconds, most preferably from about 0.2 to 5 seconds. Because the heating rate is slower in the drop method, the typical residence times in the drop method are on the order of 0.5 to 10 minutes, preferably from 0.5 to 5 minutes and more preferably from 0.5 to 3 minutes, rather than seconds, as is the case in the entrainment method.

The entrainment method involves the use of a vertical tube reaction furnace (VTR) such as are disclosed in U.S. Pat. No. 5,110,565, previously incorporated by reference. Particles of the metal-containing compound are placed into a feed hopper, which allows a flowing gas, such as air, an inert gas, or an oxidizing or reducing gas if the gas is to be the oxidizing or reducing agent in an oxidation or reduction of the metal-containing compound, to entrain the metal-containing compound and deliver it to the furnace's reaction chamber as a dust cloud. The metal-containing compound or compound mixture is immediately heated in the reaction chamber at rates of between about 10,000° C. to 100,000,000° C. per second, while the average residence time of powder in the furnace is on the order of seconds. The flowing gas carries the powder product out of the reaction chamber hot zone and into a cooling zone that rapidly cools the reacted powder below its reaction temperature. The entrainment method is more preferred than the drop method because the entrainment method is a more practical mass production method.

The reactor disclosed in U.S. Pat. No. 5,110,565 comprises four principal components of concern: a cooled reactant transport member; a reactor chamber fed by the transport member; a heating means for heating the reactor chamber and a cooling chamber fed by the reactor chamber.

The transport member can be considered to be a conduit disposed within a preferably annular gas-flow space that serves to transport the particles into the reaction chamber. The transport member is suitably maintained at a temperature below the melting temperature of the metal-containing compound so as to prevent the particles from coalescing either within, or near the exit of, the transport member. Accordingly, the temperature of the transport member should be sufficient to allow substantially all of the particles to enter the reactor chamber as discrete particles.

The metal-containing compound is suitably fed into the transport member by a powder feeding mechanism. The particular powder feeding mechanism is not critical as long as it provides a metered or controlled flow of the particles to the transport member. The feeding mechanism, for example, can be a single screw feeder, a twin screw feeder, a vibratory feeder, a rotary valve feeder, a pneumatic (gas transport) feeder, or some other feeder of conventional construction.

The reactor design and reactor capacity will determine the maximum acceptable particulate feed rates. For example, merely by way of illustration, for a reactor having a reaction zone volume of 2.16 cubic feet ($ft^3$) (0.06 cubic meter ($m^3$)) an acceptable feed rate is from about 0.02 to about 0.5 kilogram per minute (kgm). Acceptable feed rates will vary depending on the particular reaction, reactor and reactor conditions but can be determined readily without undue experimentation.

For the purposes of the present invention, it is important that the feed powder (or powder feed mixture) enters the reactor in the form of a dust cloud. Accordingly, after the powder exits the powder feeder it must go through a disperser. Several methods of dispersion are acceptable for the present invention. These methods include, but are not limited to, gas dispersion nozzles (similar to that described in U.S. Pat. No. 5,380,688), mechanical dispersers, and ultrasonic dispersion. In most cases the powder feed needs to be dispersed to agglomerates or individual particles less than 100 microns in diameter. The exact details, however, depend on the reaction being carried out and the reactor conditions being used. If the agglomerate or individual particle size is too large and the residence time at temperature too short, the reaction will not be complete.

The particles of the feed are entrained in a gas that may be either an inert gas (e.g. argon or another noble gas), or a gas that is compatible with the conversion to be carried out; that is, either a gas that is a reactant or a gas that is a byproduct of the conversion.

The entrainment gas is fed into the transport member at a pressure and a flow rate sufficient to entrain the particulate mixture and carry the particulate mixture into the reaction chamber. Thus, the flow rate determines the residence time in the reactor chamber. By way of illustration, the gas flow in the transport member and via a gas flow around the perimeter of the transport member are preferably at least 85 and 28 standard liters per minute (slm), respectively, for a reactor having a reaction zone volume of 2.16 cubic feet ($ft^3$) (0.06 cubic meter ($m^3$)). The flow rates that are used also depend upon the reactor temperature and reactant feed rate.

The present invention may be carried out in both co-current and counter-current modes of operation. Counter-current flows may be used to extend the residence time. In addition, for a particular reaction it may be beneficial to introduce gas flows at various places in the reactor. Also, for a particular reaction it may be beneficial to introduce gas flows so that they are both co-and counter-current and create turbulence in the reactor. Finally, it may be beneficial in some cases to design the introduction of the gas flows so that they create some specific gas flow pattern in the reactor (e.g., helical).

The reactant particles enter the reaction zone in a form approximating that of a well-dispersed dust cloud. The particles of the mixture are heated almost instantaneously by gas convective and conductive heat transfer, as well as by thermal radiation from the walls defining the heated reaction zone. For particles having a diameter less than 1000 microns, however, particle heating is believed to be dominated by gas/particle conduction/convection processes, rather than radiation. Internal particle conduction is extremely rapid compared to surface heating, so that the particles may be assumed to be isothermal with heating rates adequately described for the mass by the surface heating characteristics. It is on this basis that the preferred heating rate of about 10,000° C. or higher per second is calculated. The actual temperature within the reaction zone may be determined by optical pyrometry or other suitable means.

The internal wall of the reaction zone of the reactor is constructed of, or lined with, a material that does not react with the particular metal-containing compound or compounds, or other reactants, of the conversion process carried out, and that does not melt or significantly deteriorate at the temperatures employed. Depending on the reaction, the material may be graphite (or other carbonaceous materials), metal (such as a nickel alloy), or ceramic (such as aluminum oxide).

The gaseous flow that entrains the metal-containing compound and transports it into the reaction zone also carries the product powder out of the reaction zone. In general it may not be necessary to employ a designed gas-solid separator to separate the product from the entrainment gas. However, in some cases it may be beneficial to include in the reactor a section that effectively separates the product solids from the gas stream. This can be done using several conventional methods, including but not limited to, water traps, cyclones, porous metal or ceramic filters, bag filters (i.e., bag houses), gravity settling, inertial impaction, electrostatic precipitation, and scrubbers. Gas-solid separation is important in both co-current and counter-current modes. Gas-solid separation is of critical importance in the co-current mode because the gas stream may carry the product away. This would effectively limit the yield of the process and have a negative impact on the overall economics.

In reactions where a condensable gaseous by-product is produced (e.g., water vapor), it may be advantageous to design the reactor in such a way as to perform the gas-solid separation above the point at which condensation will occur (i.e., for water vapor above 100° C.).

Beneficially, the entrained dust cloud exits the reaction zone and almost immediately enters a cooling zone. The cooling zone quenches or rapidly cools the metal or metal oxide product below its reaction temperature. Cooling rates within the cooling zone beneficially approximate the heating rates within the reaction zone. The walls of the cooling zone cool the entrainment gas and rapidly remove any amount of heat retained by the product of the rapid conversion. In the absence of this rapid cooling, reaction with the particles could occur for an extended time, thereby resulting in formation of undesirable agglomerates or larger grains in the product. In addition, it may be important to rapidly cool the product so as to (a) stop the reaction, (b) quench in a specific phase, microstructure or particle size, (c) get the product down to room temperature so that it is ready for further processing or (d) for safety reasons. The actual cooling time experienced will vary depending upon factors such as the particle size, the physical configuration of the cooling zone and the exit gas flow rate.

The cooling of the product may occur in an unheated (i.e., air-cooled) section of the reactor tube. However, forced cooling in a water-jacketed section of the reactor may be employed. This section beneficially has a significantly larger cross sectional area than the reactor tube so that the product slows down.

The cooled particles are suitably collected and processed by conventional technology. The product may be collected in either a bin (tote) or other receiving vessel. In some cases, it is important that the product not be directly exposed to air because it will readily oxidize and/or is pyrophoric. In such cases it may be important to slowly passivate the product by the controlled introduction of oxygen (e.g., air/nitrogen mixes) combined (or not) with cooling. This is particularly important in the production of fine metal powders, but may also be important if the product is not the most stable oxide (e.g., CoO rather than the more stable $Co_3O_4$).

The product made by the reaction in the vertical transport reactor may be a final product ready for commercial sale, or may need further treatments. As an example, if the reaction is not carried out to substantial completion in the VTR, then a second heat treatment in a VTR or some other furnace is needed to complete the reaction. ("Substantial completion" herein means at least about 50%, more preferably at least about 75%, and most preferred at least about 90%, of the conversion is carried out to completion). Other potential finishing processes include, but are not limited to, passivation, reduction, oxidation, burnout of carbon or organics, grinding, jet milling, classification, screening or coating.

When the conversion is not substantially complete, the conversion is substantially repeated. The product of the first conversion (now referred to as the "precursor" in the second conversion) is further converted in the second conversion to reach the desired completion. Additional reactants, such as oxidizing or reducing agents, may be employed in substantially the same manner as in the first conversion to achieve substantially complete conversion. The second conversion may be carried out in a VTR or any other conventional apparatus.

Additionally, after the first conversion the precursor may be subjected to a second conversion to form a different metal or metal oxide. For example, after cobalt oxalate has been first converted to cobalt oxide, the cobalt oxide may then be converted to cobalt.

Although the drop method and entrainment method in particular may be used for rapid conversion of metal-containing compounds, any rapid heating method may be used to produce suitable powder metals and metal oxides, so long as the rapidity of the heating is maintained.

In one embodiment, the present invention is a low cost process for synthesizing fine metallic particles or powders for directly producing the fine metallic particles in the desired size range of sub-micron to micron size for a desired purpose. Basically, exposing metal-containing compounds—such as metal oxalate salts—to extremely high heating rates with short residence times in a non-oxidizing atmosphere causes the metal oxalate salts to decompose leaving only the metal behind. With heating rates on the order of 10,000° C./second and minimized reaction times less than ten (10) seconds, ultra fine metal particles are formed.

Extremely high heating rates are achievable in a transport tube reactor and allow the process to proceed as desired. The reaction proceeds by a nucleation mechanism, thus the extremely high heating rates are essential to the formation of the fine and ultra-fine metal particles. More particularly, no (or minimal) grinding of the fine metallic particles is required to reduce the particle size or classification to eliminate larger particles. Furthermore, because the product powders have sizes in the desired range (not nano-size), residual oxygen contents are low and the particle surfaces are passivated. These particles may be produced using a high temperature, short residence time transport (or aerosol) flow reactor so that rapid heating rates promote rapid dissociation of precursors and limited residence times prevent significant particle growth.

Due to the method of formation of the fine metallic particles, the particle diameter can be specifically tailored to meet very stringent specifications. More conventionally processed powders using gaseous precursors (e.g. nickel chloride) produce nano-sized fine metals that are not desirable for certain electromagnetic radiation absorption applications. Other conventional processes employing slower heating rate mechanisms (e.g. pusher kilns, strip-belt furnaces, electric arc furnaces) cannot limit residence time and the particles grow in size, even if starting metallic oxalate precursors are used. In accordance with the present invention, fine metallic powders produced by this process are useful for a wide variety of purposes including, but not limited to, electromagnetic shielding, semi-conductor applications.

As before stated, the precursors to be dissociated include various metal oxalates, carbonates, acetates, or hydroxides. For example, with the process of the present invention, nickel oxalate can be decomposed rapidly to produce fine sub-micron nickel powders of high purity and with an oxygen content less than two (2 wt. %) weight percent. In carrying out the dissociation according to the present invention, the only byproduct is $CO_2$ gas. Similar dissociation reactions are also feasible for producing fine cobalt, fine tin, and fine lead powders. Powders produced from these precursors have higher purity than powders produced from more conventionally processed gaseous homogenate precursors (e.g. nickel chloride). Such product powders contain residual halogenated species (e.g. chlorine) making them unsuitable for high purity applications.

Figure 2:
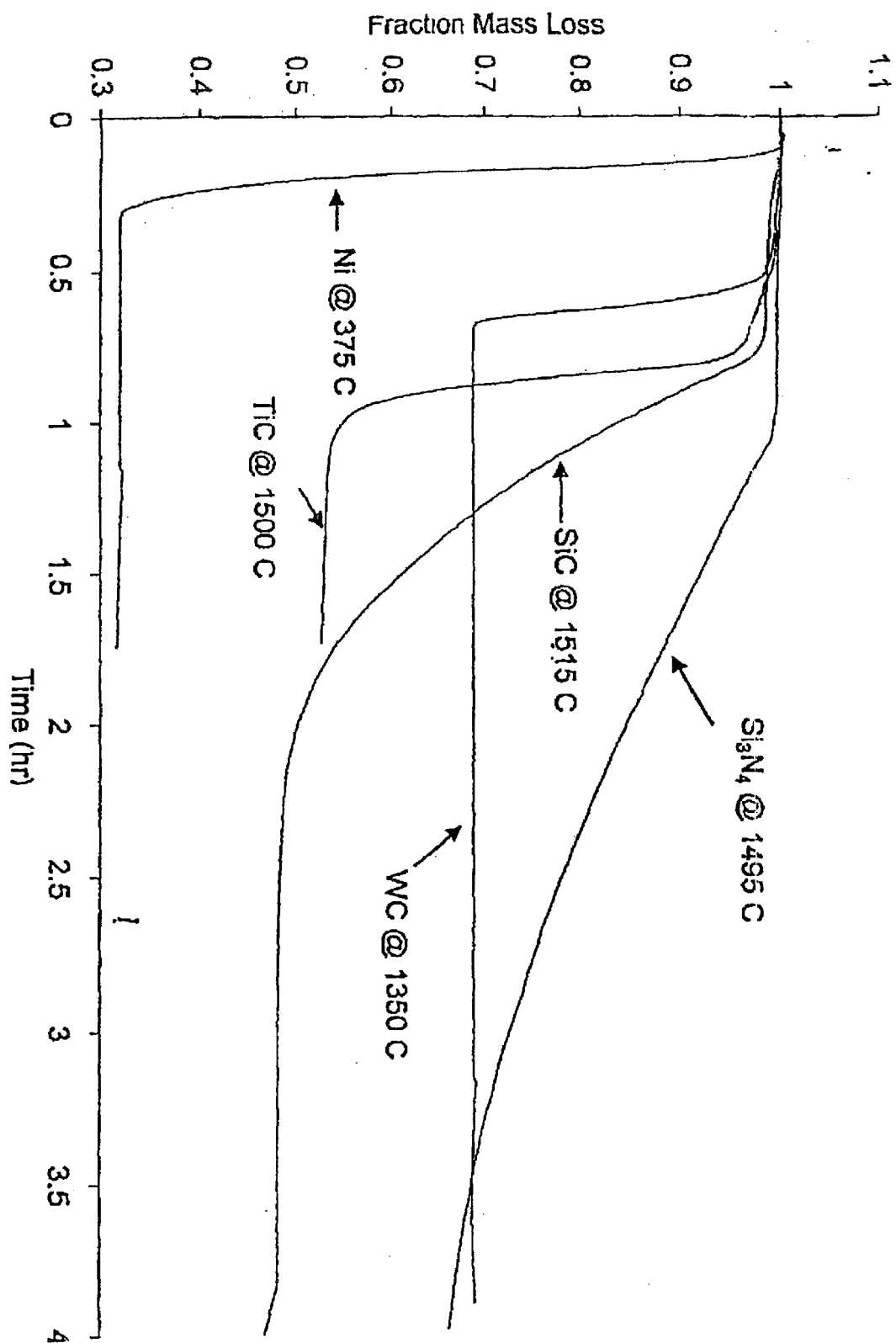
FIG. 2 is a graph illustrating the reaction rates for the dissociation of nickel (Ni) oxalate into nickel metal, according to the present invention, using a thermogravimetric analyzer (TGA) as compared to the reaction rate of tungsten carbide (WC), silicon carbide (SiC), and titanium carbide (TiC) synthesis by carbothermal reduction and the reaction rate of silicon nitride ($Si_3N_4$) synthesis by carbothermal nitridation.
Figure 3:
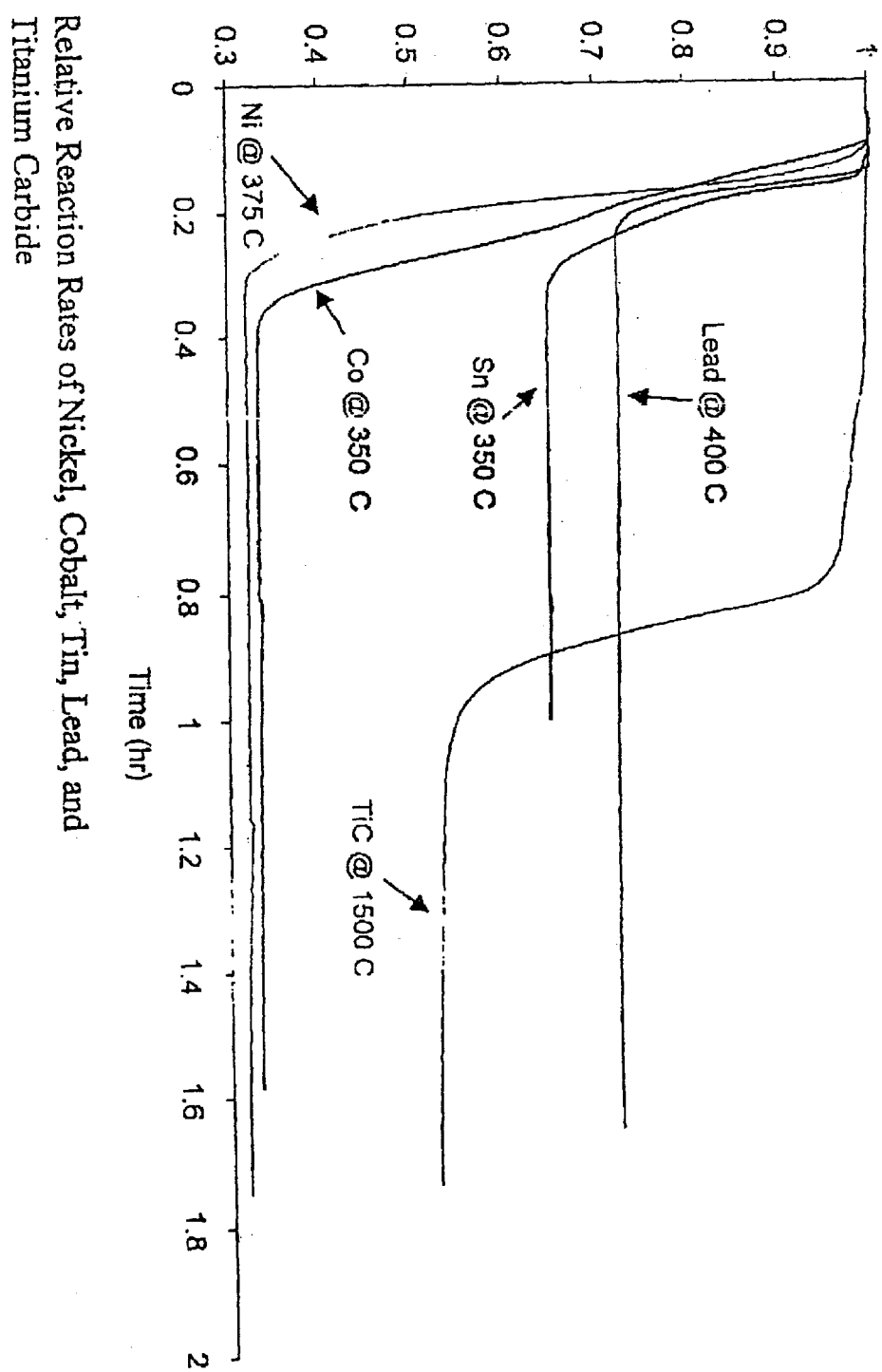
FIG. 3 is a graph illustrating the reaction rates for the production of nickel (Ni), cobalt (Co), lead (Pb), and tin (Sn) from their respective metal oxalates, according to the present invention, using a thermogravimetric analyzer.

The reaction rates for dissociation of metal oxalates are similar to those for various carbothermal reactions that have been demonstrated in transport tube aerosol flow reactors. For example, as illustrated in FIG. 2, heating rates of 0.5° C./second using a thermogravimetric analyzer indicate that the dissociation of nickel oxalate at 375° C. has a similar reaction rate to that of tungsten carbide (WC) synthesis by carbothermal reduction at 1350° C. and is faster than silicon carbide (SiC) synthesis by carbothermal reduction at 1515° C. Both of these carbothermal reactions are carried out in transport tube reactors. FIG. 3 illustrates the reaction rates for the production of nickel (Ni), cobalt (Co), lead (Pb), and tin (Sn) from their respective metal oxalates using a thermogravimetric analyzer and a heating rate of 0.5° C./second.

The type of apparatus that can be used for carrying out the process according to the present invention is similar to that described by Weimer et al., U.S. Pat. No. 5,110,565 or Matovich, U.S. Pat. Nos. 3,933,434, 4,042,334, or 4,044,117 (the disclosures of which are incorporated herein by reference).

In the process according to one embodiment of the present invention, a powdered precursor (e.g., nickel oxalate powder) is loaded into a feeding assembly and is carried with inert gas (e.g., argon or nitrogen) through a heated transport tube. Heat from the walls of the transport tube provides the energy required to thermally dissociate the precursor (e.g., nickel oxalate) to fine metallic powder and carbon dioxide gas. The fine product powders are collected in a bag house filter or some other type of fine powder collection process. The tube walls are either heated directly by electrical resistance (i.e., if it is graphite or silicon carbide) or indirectly from heated electrodes that surround the tube. The reaction tube can be fabricated from graphite, metal, a refractory oxide material, or some other high temperature material that can withstand the operating conditions. The gaseous flow rates for the sweeping inert gas and the solids feed rates are expected to be similar to those reported in the aforementioned patents. The reactor residence times are expected to be between approximately 0.1 and 10 seconds depending on the gas and solids feed rates.

Moreover, the invention as disclosed herein, may be suitably practiced in the absence of the specific elements which are disclosed herein.

The metals and metal oxide powders formed by the practice of the present invention are suitable for use in all fields in which metals and metal oxide powders produced by conventional processes are employed. The metals and metal oxide powders resulting from the present invention are suitable for use especially in the application fields of powder metallurgy, catalysts, hard metals, electrochemical devices (including batteries, capacitors, photovoltaics, sensors and fuel cells), polymer fillers, pigments, optical absorbers, display materials, precursors for thin and thick film applications, magnetic compositions, metal injection-molding, thermal spray, electronics (including conductors and dielectrics), ceramics, chemicals (such as electroplating and raw materials for forming metal-organic compositions), integrated circuits, metal matrix composites, magnetic and electric shielding, and brazing alloys, among others.

The following examples are solely for illustrative purposes and are not to be construed as limiting the scope of the present invention.

EXAMPLES

The following examples 1–37 all were conducted in a vertical transport reactor (VTR). FIG. 1 is a schematic of the reactor used. The reactor (1) had at its core a furnace (2) with a heated zone that was 6 inches in diameter and 5 foot long. The reaction tube (3) was constructed out of a high-temperature, nickel-based alloy, and extended approximately 3 feet above and 3 feet below the furnace supplying the heat. The furnace had three independently controlled heating zones (4A, 4B and 4C) capable of producing a maximum temperature of 1200° C. The feed material was fed into the top of the vertical transport reactor via a screw feeder (5). After exiting the screw feeder, the powdered feed was mechanically dispersed by a disperser (6). The dispersed powder then was sifted through a 75-micron screen (7) to remove large agglomerates. The powder mixture fell through the furnace hot zone and a cooling zone (8) and was collected in a product collection can (9) at the bottom of the reactor.

The reactor was run-in both co-current (powder and gas flowing downward) and counter-current (powder flowing downward and gas flowing upward) modes. The mode of operation was selected based upon the chemistry involved and residence time needed. In either mode of operation, the off gasses (by products) were then bubbled through a water trap (10) and burned using a propane burner. In the case of Examples 1–37 given below, all three heating zones were run at the same temperature.

The reactor used in Examples 1–37 may be varied in accordance with known engineering principles and the present disclosure to carry out the present invention.

The products of Examples 1–37 were analyzed to determine their content, crystallite size, surface area, and density. Cobalt content by volume (Co [%]) in cobalt oxide or cobalt was measured by a titration method based on the ISO 9389: 1989 (E)-standard (Determination of cobalt content—Potentiometric titration method with potassium hexacyanoferrate(III) ($K_3[Fe(CN)_6]$ solution, 223.35 grams per 10 liters). The method involves potentiometric titration using a platinum electrode. An extra amount of known potassium ferrisyanide solution was back titrated by a known Co standard solution in an alkalic matrix with ammonium citrate as a buffer.

Cobalt monoxide content by volume (CoO [%]) in cobalt oxide was measured by X-ray diffraction. The x-ray diffraction unit was calibrated with known samples by the addition method. The calibration and the measurement were based on the cobalt oxide and cobalt monoxide peak area ratios.

Cobalt metal content by volume (Metallic Co [%]) also was measured by X-ray diffraction. The x-ray diffraction unit was calibrated with known samples by the addition method. The calibration and the measurement were based on the cobalt monoxide and cobalt metal peak area ratios.

Copper content in copper oxide was measured by a titration method based on a complexometric titration using a copper electrode. The extra amount of a known EDTA solution was titrated by a known standard Cu solution in an alkalic matrix with ammonium chloride as a buffer.

Crystallite size was measured by X-ray line broadening of the peaks at 220 (Crystallite size [220]) and at 311 (Crystallite size [311]). The full widths at half maximum height of the mentioned peaks were measured and the crystallite size was calculated based on the Sherrit equation.

Surface area was measured by BET based on $N_2$ adsorption on the surface following the ASTM D4567 standard. The analysis gives the surface area in $m^2$/gram.

Apparent density (AD) was measured by the ASTM B213 standard. The measurement gives the loose density of the product in grams/cc.

Tap density (TD) was measured by the ASTM B527 standard in which the product sample is tapped to give packed density in grams/cc.

Decomposition/Oxidation of Cobalt Hydroxide

Example 1

The reactor described above was used in an attempt to carry out the general reaction shown below.

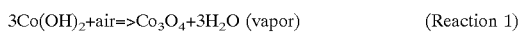

$3Co(OH)_2+air=>Co_3O_4+3H_2O$ (vapor)   (Reaction 1)

The $Co(OH)_2$ feed material was obtained from OMG Kokkola Chemicals Oy (Kokkola, Finland). This particular material (Lot Number C04-9207) had an average agglomerate size of 1 micron. The $Co(OH)_2$ feed material is pink or light red in color. The feed material was fed into the vertical transport reactor at a rate of 1.7 kg per hour. The gas medium used for this particular run was air flowing at 20 scfh (standard cubic feet per hour) in a co-current mode. The temperatures for all three zones of the VTR were controlled at 500° C. Under these conditions the residence time is estimated to be 4–6 seconds. After 30 minutes had elapsed the feeder was shut off and the product was taken out of the product collection can. The product collection can contained powder and also water that had condensed from the off gases. Approximately 0.67 kg of dried product was obtained. From a visual standpoint, the product was a fine black powder (i.e., $Co_3O_4$). These results indicate that desired reaction (Reaction 1) occurred.

Example 2

Example 1 was repeated except that the temperatures on all three zones of the VTR were increased to 600° C. Under these conditions the residence time was estimated to be 4–6 seconds. The dried product that was collected was approximately 0.65 kg and it was again a fine black ($Co_3O_4$) powder.

Example 3

Example 1 was repeated except that the temperatures on all three zones of the VTR were increased to 700° C. Under these conditions the residence time was estimated to be 4–6 seconds. The dried product that was collected was approximately 0.65 kg and, as was the case in Examples 1 and 2, above, it was a fine black powder.

Example 4

Example 1 was repeated except that the temperatures on all three zones of the VTR were increased to 800° C. and the runtime was decreased to 18 minutes. Under these conditions the residence time is estimated to be 4–6 seconds. The dried product that was collected was approximately 0.40 kg of a fine black powder.

Example 5

Example 1 was repeated except that the temperatures on all three zones of the VTR were increased to 700° C. and the gas flow was switched to the counter-current mode. Under these conditions the residence time was estimated to be 6–8 seconds. The product that was collected was entirely dry (i.e., the by-product water vapor had been carried off in the off-gases at the top of the reactor). Approximately 0.66 kg of product was collected. The product was a fine black powder (i.e., $Co_3O_4$).

Example 6

Example 5 was repeated except that the temperatures on all three zones of the VTR were increased to 600° C. Under these conditions the residence time was estimated to be 6–8 seconds. Approximately 0.64 kg of a dry, fine black powder was collected.

Example 7

Example 5 was repeated except that the temperatures on all three zones of the VTR were decreased to 500° C. Under these conditions the residence time was estimated to be 6–8 seconds. Approximately 0.63 kg of a dry, fine black powder was collected.

A summary of the run conditions for the Decomposition/Oxidation of Cobalt Hydroxide examples 1–7 is given below in Table 1.

TABLE 1

| Example | Feed | Feed Rate (kg/hr) | Gas Phase | Gas Flow Rate (scfh) | Mode | Temp. (° C.) |
|---|---|---|---|---|---|---|
| 1 | $Co(OH)_2$ | 1.7 | Air | 20 | Co-current | 500 |
| 2 | $Co(OH)_2$ | 1.7 | Air | 20 | Co-current | 600 |
| 3 | $Co(OH)_2$ | 1.7 | Air | 20 | Co-current | 700 |
| 4 | $Co(OH)_2$ | 1.7 | Air | 20 | Co-current | 800 |
| 5 | $Co(OH)_2$ | 1.7 | Air | 20 | Counter-current | 700 |
| 6 | $Co(OH)_2$ | 1.7 | Air | 20 | Counter-current | 600 |
| 7 | $Co(OH)_2$ | 1.7 | Air | 20 | Counter-current | 500 |

A summary of the experimental results for the Decomposition/Oxidation of Cobalt Hydroxide examples 1–7 is given below in Table 2.

TABLE 2

| Example | Run Time (min.) | Product Collected (kg) | Product Color | Product Composition |
|---|---|---|---|---|
| 1 | 30 | 0.67 | Black | $Co_3O_4$ |
| 2 | 30 | 0.65 | Black | $Co_3O_4$ |
| 3 | 30 | 0.65 | Black | $Co_3O_4$ |
| 4 | 18 | 0.40 | Black | $Co_3O_4$ |
| 5 | 30 | 0.66 | Black | $Co_3O_4$ |
| 6 | 30 | 0.64 | Black | $Co_3O_4$ |
| 7 | 30 | 0.60 | Black | $Co_3O_4$ |

A summary of analyses on the $Co_3O_4$ products collected from the Decomposition/Oxidation of Cobalt Hydroxide examples 1–7 is given below in Table 3.

TABLE 3

| Example | Co [%] | CoO [%] | Metallic Co [%] | Surface Area ($m^2/g$) | AD (g/cc) | TD (g/cc) | Crystallite Size [220] in nm | Crystallite Size [311] in nm |
|---|---|---|---|---|---|---|---|---|
| 1 | 71.0 | — | — | 30.5 | 0.71 | 1.03 | — | — |
| 2 | 71.2 | — | — | 28.1 | 0.75 | 1.10 | — | — |
| 3 | 70.2 | — | — | 25.7 | 0.79 | 1.15 | — | — |
| 4 | 71.6 | — | — | 22.6 | 1.00 | 1.48 | — | — |
| 5 | 73.5 | 2 | <1 | 8.2 | 0.99 | 1.42 | 50 | 47 |
| 6 | 72.5 | 1 | <1 | 12.4 | 0.85 | 1.21 | 35 | 32.5 |
| 7 | 72.5 | <1 | <1 | 18.6 | 0.80 | 1.13 | 23 | 21 |

Decomposition/Reduction of Cobalt Hydroxide

Example 8

The reactor described above was used to carry out the general reaction shown below.

$Co(OH)_2 + H_2 => Co + 2H_2O(vapor)$ (Reaction 2)

The $Co(OH)_2$ feed material was the same as in Example 1. The feed material was into the vertical transport reactor at a rate of 1.7 kg per hour. The gas medium used his particular ran was hydrogen flowing at 50 scfh in a co-current mode. The temperatures for all three zones of the VTR were controlled at 800° C. After 15 minutes had elapsed the feeder was shut off and the product was taken out of the product collection can. The product collection can contained powder and also water that had condensed from the off gases. Approximately 0.25 kg of dried product was obtained. From a visual standpoint, the product was a fine gray powder (i.e., Co). These results indicate that desired reaction (Reaction 2) occurred.

Example 9

Example 8 was repeated except the temperatures on all three zones of the VTR were decreased to 700° C. The dried product collected was approximately 0.23 kg and it was again a fine gray powder.

Example 10

Example 8 was repeated except the temperatures on all three zones of the VTR were decreased to 400° C. The dried product that was collected was approximately 0.30 kg and it was a fine blackish-gray powder. The results from this example indicate that the reaction was not entirely complete. This may have been due to the fact that either the temperature was too low, the residence time at that temperature was too short, or the degree of dispersion was inadequate for these particular conditions.

Example 11

Example 8 was repeated except the temperatures on all three zones of the VTR were decreased to 500° C. and the hydrogen gas flow was run in a counter-current mode. The product that was collected was entirely dry (i.e., the by-product water vapor had been carried off in the off-gases at the top of the reactor). Approximately 0.24 kg of product was collected. The product was a fine blackish-gray powder. These results indicated that the reaction was not entirely complete.

Example 12

Example 11 was repeated except the temperatures on all three zones of the VTR were increased to 600° C. Approximately 0.25 kg of dry product was collected. The product was a fine gray powder (i.e., Co).

Example 13

Example 11 was repeated except the temperatures on all three zones of the VTR were increased to 700° C. Approximately 0.25 kg of dry product was collected. The product was a fine gray powder (i.e., Co). The results from Examples 11 thru 13 show that it is feasible to make a cobalt powder by rapid decomposition of a metal hydroxide via reaction 2.

A summary of the run conditions for the Decomposition/Reduction of Cobalt Hydroxide examples 8–13 is given below in Table 4.

TABLE 4

| Example | Feed | Feed Rate (kg/hr) | Gas Phase | Gas Flow Rate (scfh) | Mode | Temp. (° C.) |
|---|---|---|---|---|---|---|
| 8 | $Co(OH)_2$ | 1.7 | Hydrogen | 50 | Co-current | 800 |
| 9 | $Co(OH)_2$ | 1.7 | Hydrogen | 50 | Co-current | 700 |
| 10 | $Co(OH)_2$ | 1.7 | Hydrogen | 50 | Co-current | 400 |
| 11 | $Co(OH)_2$ | 1.7 | Hydrogen | 50 | Counter-current | 500 |
| 12 | $Co(OH)_2$ | 1.7 | Hydrogen | 50 | Counter-current | 600 |
| 13 | $Co(OH)_2$ | 1.7 | Hydrogen | 50 | Counter-current | 700 |

A summary of the experimental results for the Decomposition/Reduction of Hydroxide examples 8–13 is given below in Table 5.

TABLE 5

| Example | Run Time (min.) | Product Collected (kg) | Product Color | Product Composition |
|---|---|---|---|---|
| 8 | 30 | 0.67 | Gray | Co |
| 9 | 30 | 0.65 | Gray | Co |
| 10 | 30 | 0.65 | Blackish-Gray | $Co/Co_3O_4$ |
| 11 | 18 | 0.40 | Blackish-Gray | $Co/Co_3O_4$ |
| 12 | 30 | 0.66 | Gray | Co |
| 13 | 30 | 0.64 | Gray | Co |

A summary of analyses on the Co products collected from examples 8–13 is given below in Table 6.

TABLE 6

| Example | Co [%] | Conversion [%] | Surface Area (m²/g) | Oxygen [%] | Carbon [ppm] | Sulfur [ppm] |
|---|---|---|---|---|---|---|
| 8 | 76.2 | 39 | 2.7 | — | — | — |
| 9 | — | — | — | — | — | — |
| 10 | 77.1 | 42 | — | — | — | — |
| 11 | — | — | 3.4 | — | — | — |
| 12 | — | — | 1.9 | — | — | — |
| 13 | — | — | 1.1 | — | — | — |

Decomposition/Oxidation of Copper Hydroxide

Example 14

The reactor described above was used to carry out the general reaction shown below.

$Cu(OH)_2 + air => CuO + 2H_2O(vapor)$ (Reaction 3)

The $Cu(OH)_2$ feed material was obtained from Aldrich Chemical Company, Milwaukee, Wis. and had an approximate agglomerate size of 20 microns. The $Cu(OH)_2$ is blue in color. The feed material was fed into the vertical transport reactor at a rate of 1.16 kg per hour. The gas medium was air flowing at 20 scfh in a counter-current mode. The temperatures for all three zones of the VTR were controlled at 300° C. Under these conditions the residence time was estimated to be 2–4 seconds. After 30 minutes had elapsed the feeder was shut off and the product was taken out of the product collection can. The dry product collected was mostly a fine black powder (i.e., CuO) with a few larger (~75 micron) chunks of unreacted blue hydroxide. Approximately 0.42 kg of product was obtained. These results indicate that desired reaction (Reaction 3) occurred. The larger chunks of unreacted hydroxide indicate that the dispersion may need to be improved somewhat for this reaction under these conditions.

Example 15

Example 14 was repeated except the temperature in all three zones of the VTR was increased to 500° C. Approximately 0.40 kg of dry product was collected. The product collected was nearly identical to that produced in Example 14, except for the fact that the concentration of the unreacted hydroxide was lower.

Example 16

Example 15 was repeated except the counter-current gas flow was increased to 40 scfh. This yielded a slightly longer residence time than in Example 14 or 15.

Approximately 0.43 kg of dry product was collected. The product collected was nearly identical to that produced in Example 15.

Example 17

Example 16 was repeated except the temperature of all three zones of the VTR was increased to 700° C. Approximately 0.41 kg of dry product was collected. The product collected was nearly identical to that produced in Example 16 except that the concentration of the unreacted hydroxide was even lower.

Example 18

Example 16 was repeated except the temperature of all three zones of the VTR was increased to 800° C. and the reaction was run for only 15 minutes. Approximately 0.19 kg of dry product was collected. The product collected was nearly identical to that produced in Example 17 except that the concentration of the unreacted hydroxide was even lower.

The results of Examples 14 to 18 indicate that the $Cu(OH)_2$ needs to be well dispersed and that the tendency to have large unreacted agglomerates decreases with increasing temperature.

A summary of the run conditions for the Decomposition/Oxidation of Copper Hydroxide examples 14–18 is given below in Table 7.

TABLE 7

| Example | Feed | Feed Rate (kg/hr) | Gas Phase | Gas Flow Rate (scfh) | Mode | Temp. (° C.) |
|---|---|---|---|---|---|---|
| 14 | $Cu(OH)_2$ | 1.16 | Air | 20 | Counter-current | 300 |
| 15 | $Cu(OH)_2$ | 1.16 | Air | 20 | Counter-current | 500 |
| 16 | $Cu(OH)_2$ | 1.16 | Air | 40 | Counter-current | 500 |
| 17 | $Cu(OH)_2$ | 1.16 | Air | 40 | Counter-current | 700 |
| 18 | $Cu(OH)_2$ | 1.16 | Air | 40 | Counter-current | 800 |

A summary of the experimental results for the Decomposition/Reduction of Copper Hydroxide examples 14–18 is given below in Table 8.

TABLE 8

| Example | Product Collected (kg) | Product Color | Product Composition |
|---|---|---|---|
| 14 | 0.42 | Black | CuO |
| 15 | 0.40 | Black | CuO |
| 16 | 0.43 | Black | CuO |
| 17 | 0.41 | Black | CuO |
| 18 | 0.19 | Black | CuO |

A summary of analyses on the CuO products collected from the Decomposition/Reduction of Copper Hydroxide examples 14–18 is given below in Table 9

TABLE 9

| Example | Cu [%] | Surface Area ($m^2$/g) | AD (g/cc) |
|---|---|---|---|
| 14 | 74.2 | 60.9 | 1.0 |
| 15 | 75.0 | 32.7 | 1.1 |
| 16 | 76.5 | 32.8 | 1.1 |
| 17 | 77.2 | 15.1 | 1.2 |
| 18 | 78.0 | 8.2 | 1.2 |

Decomposition/Reduction of Copper Hydroxide

Example 19

Example 17 was repeated except the gas was changed to hydrogen. Approximately 0.29 kg of dry product was collected. The product was bright copper colored (i.e.,Cu Powder) when first removed from the product collection can, but readily turned a purplish color after being exposed to air (i.e., $Cu_2O$). These results show the present invention can be used to make Copper powder via the reaction shown below.

$$Cu(OH)_2 + H_2 = Cu + 2H_2O(vapor) \qquad \text{(Reaction 4)}$$

Oxidation of Cobalt Powder

Example 20

The reactor described above was used to carry out the general reaction shown below.

$$3Co + Air => Co_3O_4 \qquad \text{(Reaction 5)}$$

The Co powder feed material was obtained from OMG Kokkola Chemicals Oy (Kokkola, Finland) and had an approximate agglomerate size of 6 microns and an ultimate crystallite size of 0.8 microns. The cobalt powder was gray in color and the lot number was P32-9207. The feed material was fed into the vertical transport reactor at a rate of 1.1 kg per hour. The gas medium used was air flowing at 100 scfh in a counter-current mode. The temperatures for all three zones of the VTR were controlled at 900° C. Under these conditions the residence time was estimated to be 2–4 seconds. After 30 minutes had elapsed the feeder was shut off and the product can was opened. As soon as air hit the product, it began to further oxidize and burn. These results indicate that either the residence time was too short or the temperature too low to complete this oxidation reaction. Higher temperatures and/or longer residence times would allow this reaction to be completed.

Reduction of Cobalt Oxide

Example 21

The reactor described above was used to carry out the general reaction shown below.

$$Co_3O_4 + 4H_2 = 3Co + 4H_2O(vapor) \quad \text{(Reaction 6)}$$

The $Co_3O_4$ powder feed material was obtained from OMG Kokkola Chemicals Oy (Kokkola, Finland). This particular material had a surface area of 0.9 $m^2/g$ and had an approximate agglomerate size of 4 microns. The powder was black in color and the lot number was C12-9354-2. The feed material was fed into the vertical transport reactor at a rate of 1.43 kg per hour. The gas medium used for this particular run was hydrogen flowing at 50 scfh in a counter-current mode. The temperatures for all three zones of the VTR were controlled at 400° C. Under these conditions the residence time was estimated to be 2–4 seconds. After 20 minutes had elapsed the feeder was shut off and the product was removed from the collection can. Approximately 0.43 kg of fine black powder (i.e., $Co_3O_4$) was recovered.

Example 22

Example 21 was repeated except the temperature in all three zones of the VTR was increased to 600° C. Approximately 0.40 kg of a fine blackish-gray powder (i.e., $Co_3O_4$ and Co) was recovered.

Example 23

Example 22 was repeated except the counter-current hydrogen gas flow was increased to 100 scfh. Approximately 0.38 kg of a fine gray powder (i.e., Co) was recovered.

Example 24

Example 22 was repeated except the temperature in all three zones of the VTR was increased to 800° C. Approximately 0.36 kg of a fine gray powder (i.e., Co) was recovered.

Example 25

Example 22 was repeated except $Co_3O_4$ was the feed material. The new feed material had a surface area of 1.5 $m^2/g$ and had an average agglomerate size of 4 microns. The material was obtained from OMG Kokkola Chemicals Oy (Kokkola, Finland) and had a lot number of C12-9313-1. This feed material was also black in color. The feed rate was set at 1.07 kg per hour. Approximately 0.36 kg of dry product was collected in 30 minutes. The product was a fine gray powder (i.e., Co powder).

Example 26

Example 25 was repeated except the counter-current hydrogen gas flow rate was increased to 100 scfh. Approximately 0.38 kg of a fine, dry, gray powder (i.e., Co powder) was collected.

Example 27

Example 25 was repeated except the temperature on all three zones of the VTR was increased to 800° C. Approximately 0.40 kg of a fine, dry, gray powder (i.e., Co powder) was collected.

The results of Examples 21 to 27 indicate that the $Co_3O_4$ can be effectively reduced to cobalt powder by the present invention. Further, by using this invention the surface area differences in the feed materials can be maintained in the final cobalt powder. The materials produced with the higher surface area oxide were much more pyrophoric (suggesting higher surface area) than the products made with the lower surface area oxide.

A summary of the run conditions for the Reduction of Cobalt Oxide, Examples 21–27, is given below in Table 10.

TABLE 10

| Example | Feed | Feed Rate (kg/hr) | Gas Phase | Gas Flow Rate (scfh) | Mode | Temp. (° C.) |
| --- | --- | --- | --- | --- | --- | --- |
| 21 | $Co_3O_4$ (0.9 SA) | 1.43 | Hydrogen | 50 | Counter-current | 400 |
| 22 | $Co_3O_4$ (0.9 SA) | 1.43 | Hydrogen | 50 | Counter-current | 600 |
| 23 | $Co_3O_4$ (0.9 SA) | 1.43 | Hydrogen | 100 | Counter-current | 600 |
| 24 | $Co_3O_4$ (0.9 SA) | 1.43 | Hydrogen | 50 | Counter-current | 800 |
| 25 | $Co_3O_4$ (1.5 SA) | 1.07 | Hydrogen | 50 | Counter-current | 600 |
| 26 | $Co_3O_4$ (1.5 SA) | 1.07 | Hydrogen | 100 | Counter-current | 600 |
| 27 | $Co_3O_4$ (1.5 SA) | 1.07 | Hydrogen | 50 | Counter-current | 800 |

A summary of the experimental results for the Reduction of Cobalt Oxide, Examples 21–27, is given below in Table 11.

TABLE 11

| Example | Run Time (min.) | Product Collected (kg) | Product Color | Product Composition |
| --- | --- | --- | --- | --- |
| 21 | 20 | 0.43 | Black | $Co_3O_4$ |
| 22 | 20 | 0.40 | Gray-Black | $Co/Co_3O_4$ |
| 23 | 20 | 0.38 | Gray | Co |
| 24 | 20 | 0.36 | Gray | Co |
| 25 | 30 | 0.36 | Gray | Co |
| 26 | 30 | 0.38 | Gray | Co |
| 27 | 30 | 0.40 | Gray | Co |

A summary of analyses on the cobalt products collected from Examples 21–27 is given below in Table 12.

TABLE 12

| Example | Co [%] | Conversion [%] | Surface Area ($m^2/g$) | Oxygen [%] | Carbon [ppm] | Sulfur [ppm] |
| --- | --- | --- | --- | --- | --- | --- |
| 21 | 73.5 | 1 | 1.2 | — | — | — |
| 22 | — | — | 5.1 | — | — | — |
| 23 | — | — | 5.2 | — | — | — |
| 24 | — | — | 3.1 | — | — | — |

TABLE 12-continued

| Example | Co [%] | Conversion [%] | Surface Area (m²/g) | Oxygen [%] | Carbon [ppm] | Sulfur [ppm] |
|---|---|---|---|---|---|---|
| 25 | — | — | 5.6 | 2.9 | 723 | <10 |
| 26 | — | — | 5.8 | — | — | — |
| 27 | — | — | 2.2 | 2.2 | 459 | 12 |

Oxidation of Cobalt Monoxide

Example 28

The reactor described above was used to carry out the general reaction shown below.

$$3CoO + Air => Co_3O_4 \quad \text{(Reaction 7)}$$

The CoO powder feed material was obtained from OMG Kokkola Chemicals Oy (Kokkola, Finland). This particular material had an average agglomerate size of 1–2 microns. The powder was brownish in color and the lot number was D13-0023. The feed material was fed into the vertical transport reactor at a rate of 2.98 kg per hour. The gas medium used was air flowing at 35 scfh in a counter-current mode. The temperatures for all three zones of the VTR were controlled at 600° C. Under these conditions the residence time was estimated to be 2–4 seconds. After 45 minutes had elapsed the feeder was shut off and the product was removed from the collection can. Approximately 2.4 kg of fine black powder (i.e., $Co_3O_4$) was recovered.

Example 29

Example 28 was repeated except the temperature in all three zones of the VTR was increased to 700° C. After 30 minutes, approximately 1.56 kg of a fine black powder (i.e., $Co_3O_4$) was recovered.

Example 30

Example 28 was except the temperature in all three zones of the VTR was increased to 800° C. After 30 minutes, approximately 1.6 kg of a fine black powder (i.e., $Co_3O_4$) was recovered.

A summary of analyses on the $Co_3O_4$ products collected from Examples 28–30 is given below in Table 13.

TABLE 13

| Example | Co [%] | CoO [%] | Metallic Co [%] | Surface Area (m²/g) | AD (g/cc) | TD (g/cc) | Crystallite Size [220] in nm | Crystallite Size [311] in nm |
|---|---|---|---|---|---|---|---|---|
| 28 | — | — | <1 | 3.6 | 0.75 | 1.11 | 20 | 15 |
| 29 | — | — | <1 | 3.4 | 0.81 | 1.12 | 30 | 25 |
| 30 | — | — | <1 | 3.3 | 0.80 | 1.10 | 40 | 39 |

Decomposition/Reduction of Cobalt Oxalate

Example 31

The reactor described above was used to simultaneously decompose and reduce cobalt oxalate ($CoC_2O_4 \cdot 2H_2O$) to Cobalt Powder. The cobalt oxalate feed material used was an experimental material obtained from OMG Kokkola Chemicals Oy (Kokkola, Finland). The oxalate powder has an average agglomerate size of approximately 40 microns and is pink-orange in color. The feed material was fed into the vertical transport reactor at a rate of 0.30 kg per hour. The gas medium used was hydrogen flowing at 50 scfh in a counter-current mode. The temperatures for all three zones of the VTR were controlled at 500° C. Under these conditions the residence time was estimated to be 2–4 seconds. After 30 minutes had elapsed the feeder was shut off and the product was removed from the collection can. Approximately 0.1 kg of fine gray-black powder (i.e., Co & $Co_3O_4$) was recovered.

Example 32

Example 31 was repeated except the temperature in all three zones of the VTR was increased to 600° C. After 30 minutes had elapsed the feeder was shut off and the product was removed from the collection can. Approximately 0.1 kg of fine gray powder (i.e., Co) was recovered.

Example 33

Example 31 was repeated except the temperature in all three zones of the VTR was increased to 800° C., After 30 minutes had elapsed the feeder was shut off and the product was removed from the collection can. Approximately 0.1 kg of fine gray powder (i.e., Co) was recovered.

A summary of analyses on the cobalt products collected from Examples 31–33 is given below in Table 14.

TABLE 14

| Example | Co [%] | Conversion [%] | Surface Area (m²/g) | Oxygen [%] | Carbon [ppm] | Sulfur [ppm] |
|---|---|---|---|---|---|---|
| 31 | — | — | 17.0 | — | — | — |
| 32 | — | — | 3.2 | 1.0 | 670 | <10 |
| 33 | — | — | 1.1 | 1.1 | 313 | <10 |

Decomposition/Oxidation of Cobalt Oxalate

Example 34

The reactor described above was used to simultaneously decompose and oxidize cobalt oxalate ($CoC_2O_4 \cdot 2H_2O$) to Cobalt Oxide Powder. The cobalt oxalate feed material used was an experimental material obtained from OMG Kokkola Chemicals Oy (Kokkola, Finland). The oxalate powder has an average agglomerate size of approximately 40 microns and is pink-orange in color. The feed material was fed into the vertical transport reactor at a rate of 0.30 kg per hour. The gas medium used was air flowing at 50 scfh in a counter-current mode. The temperatures for all three zones of the VTR were controlled at 600° C. Under these conditions the residence time is estimated to be 2–4 seconds. After 30 minutes had elapsed the feeder was shut off and the product was removed from the collection can. Approximately 0.15 kg of fine black powder (i.e., $Co_3O_4$) was recovered.

Example 35

Example 34 was repeated except the temperature in all three zones of the VTR was increased to 800° C. After 30 minutes had elapsed the feeder was shut off and the product was removed from the collection can. Approximately 0.15 kg of fine black powder (i.e., $Co_3O_4$) was recovered.

A summary of analyses on the $Co_3O_4$ products collected from Examples 34 and 35 is given below in Table 15.

TABLE 15

| Example | Co [%] | CoO [%] | Metallic Co [%] | Surface Area ($m^2/g$) | AD (g/cc) | TD (g/cc) | Crystallite Size [220] in nm | Crystallite Size [311] in nm |
|---------|--------|---------|-----------------|------------------------|-----------|-----------|------------------------------|------------------------------|
| 34      | —      | —       | <1              | 2.4                    | 0.37      | 0.81      | —                            | —                            |
| 35      | —      | —       | <1              | 1.4                    | 0.29      | 0.59      | —                            | —                            |

Calcination/Decomposition of $LiCoO_2$ Feed

Example 36

The reactor described above was used in the production of $LiCoO_2$. An experimental $LiCoO_2$ feed material consisting of a mixture of $LiCO_3$ and $Co_3O_4$ was used. The reactor was used in counter-current mode at an airflow rate of 50 scfh. The feed material was gray in color and was fed at a rate of 0.4 kg per hour. The temperatures of all three zones of the VTR were set at 800° C. After 20 minutes, approximately 0.10 kg of a fine black powder was collected. The material clearly changed color during the reaction.

Example 37

Example 36 was repeated except the temperature in all three zones of the VTR was increased to 1000° C. After 20 minutes, approximately 0.10 kg of a fine black powder was collected.

The following examples 38–82 all were conducted in a vertical transport reactor similar to the VTR used in examples 1–37, and depicted in FIG. 1, except that a gaseous dispersion nozzle was used to disperse the feed powder instead of a mechanical disperser. The reactor had at its core a furnace with a heated zone that was 6 inches in diameter and 5 foot long. The reaction tube was constructed out of a high-temperature, nickel-based alloy, and extended approximately 3 feet above and 3 feet below the furnace supplying the heat. The furnace had three independently controlled heating zones capable of producing a maximum temperature of 1200° C. The feed material was fed via a screw feeder to a dispersion nozzle at the top of the vertical transport reactor. The dispersion nozzle had variable inside diameters of 3 mm and 5 mm. The dispersion gas (air) carried the powdered feed to and through the furnace hot zone and a cooling zone. The product of the reaction was collected in a product collection can at the bottom of the reactor.

In addition to the dispersion gas which was fed co-current with the powder feed, a second process gas (also air) was fed counter-current to the powder feed. In the examples 38–82 given below, all three reaction zones were at the same temperature.

The products of Examples 38–82 were analyzed to determine their content, crystallite size, surface area, and density. Cobalt content (Co [%]) in cobalt oxide or cobalt, cobalt monoxide content (CoO [%]) in cobalt oxide, cobalt metal content (Metallic Co [%]), crystallite size (Crystallite size [220] and Crystallite size [311]), surface area, apparent density (AD), and tap density (TD) all were measured in the same manner as they were for Examples 1–37.

Oxygen, carbon, and sulfur contents by weight were measured by the ASTM E1019 standard using an oxygen analyzer manufactured by LECO Corporation (St. Josephs, Mich.)

Some products were also analyzed for particle size using Fischer Sub-Sieve Size (FSSS) based on the ASTM B330 or C721 standards. The analysis provides the particle size of the product in microns. Particle size also was measured by a dry laser scattering method in which powder product was dispersed in an air stream and passed by a laser beam. The laser beam scatters at different angles depending on the particle size distribution of the sample product. The diffraction angles are measured and the particle size distribution determined. Ten percent of the particles had a size of less than d10, fifty percent of the particles had a size less than d50, and ninety percent of the particles had a size less than d90.

Decomposition/Oxidation of Cobalt Hydroxide

Example 38

The above-described reactor was used to carry out the same reaction as in Examples 1–7:

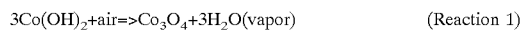
$3Co(OH)_2 + air => Co_3O_4 + 3H_2O(vapor)$ (Reaction 1)

The $Co(OH)_2$ feed material was identical to that used in Examples 1–7. The $Co(OH)_2$ was fed at 1.2 kg/hour. Both the dispersion gas and the process gas were air, with the dispersion gas flowing at 3 $m^3$/hour and the process gas flowing at 0.5 $m^3$/hour. The average temperatures for all three zones of the VTR, the feeder pressure and dispersion pressure were as set forth in Table 16 below. The inside diameter of the disperser nozzle was 3 mm.

Example 39

Example 38 was repeated except that the dispersion gas flow was increased to 5 $m^3$/hour, and the average temperatures for all three zones of the VTR, the feeder pressure and dispersion pressure were as set forth in Table 16 below.

Example 40

Example 38 was repeated except that the dispersion gas flow rate was increased to 4 $m^3$/hour, and the average temperatures for the three zones of the VTR, the feeder pressure and dispersion pressure were as set forth in Table 16 below.

Example 41

Example 38 was repeated except that the dispersion gas flow rate was 3.9 $m^3$/hour, the process gas flow rate was 1 m³/hour, and the average temperatures for the three zones of the VTR, the feeder pressure and dispersion pressure were as set forth in Table 16 below.

Example 42

Example 40 was repeated except that the process gas flow rate was increased to 1.7 m³/hour, and the average temperatures for the three zones of the VTR and the feeder pressure and dispersion pressure were as set forth in Table 16 below.

Example 43

Example 42 was repeated except that the process gas flow rate was reduced to 1 m³/hour, and the average temperatures for the three zones of the VTR and the feeder pressure and dispersion pressure were as set forth in Table 16 below.

Example 44

Example 43 was repeated except that the Co(OH)$_2$ feed rate was increased to 3 kg/hour, and the average temperatures for the three zones of the VTR and the feeder pressure and dispersion pressure were as set forth in Table 16 below.

Example 45

Example 43 was repeated except that the Co(OH)$_2$ feed rate was increased to 5 kg/hour, and the average temperatures for the three zones of the VTR and the feeder pressure and dispersion pressure were as set forth in Table 16 below.

Example 46

Example 43 was repeated except that the Co(OH)$_2$ feed rate was increased to 10 kg/hour, the dispersion gas flow rate was decreased to 3 m³/hour, and the average temperatures for the three zones of the VTR and the feeder pressure and dispersion pressure were as set forth in Table 16 below.

Example 47

Example 46 was repeated except that the dispersion gas feed rate was increased to 5 m³/hour, the disperser nozzle's inside diameter was increased to 5 mm, and the average temperatures for the three zones of the VTR and the feeder pressure and dispersion pressure were as set forth in Table 16 below.

Example 48

Example 47 was repeated except that the Co(OH)$_2$ feed rate was increased to 12.5 kg/hour, and the average temperatures for the three zones of the VTR and the feeder pressure and dispersion pressure were as set forth in Table 16 below.

Example 49

Example 47 was repeated except that the Co(OH)$_2$ feed rate was increased to 15 kg/hour, and the average temperatures for the three zones of the VTR and the feeder pressure and dispersion pressure were as set forth in Table 16 below.

Example 50

Example 47 was repeated except that the Co(OH)2 feed rate was increased to 17.5 kg/hour, and the average temperatures for the three zones of the VTR and the feeder pressure and dispersion pressure were as set forth in Table 16 below.

Example 51

Example 47 was repeated except that the Co(OH)$_2$ feed rate was increased to 20 kg/hour, and the average temperatures for the three zones of the VTR and the feeder pressure and dispersion pressure were as set forth in Table 16 below.

Example 52

Example 47 was repeated except that the Co(OH)$_2$ feed rate was increased to 21.05 kg/hour, and the average temperatures for the three zones of the VTR and the feeder pressure and dispersion pressure were as set forth in Table 16 below.

A summary of the run conditions for Examples 38–52 is given below in Table 16.

TABLE 16

| Example | Feed Rate (kg/hr) | Disperse Gas (m³/h) | Process Gas (m³/h) | Temp 1 [° C.] | Temp 2 [° C.] | Temp 3 [° C.] | Temp product (° C.) | Feeder Pressure (mm H2O) | Disp. Pressure (mm H2O) | Nozzle (mm) |
|---|---|---|---|---|---|---|---|---|---|---|
| 38 | 1.2 | 3 | 0.5 | 714 | 711 | 714 | 12 | 651 | 616 | 3 |
| 39 | 1.2 | 5 | 0.5 | 704 | 703 | 707 | 13 | 701 | 1776 | 3 |
| 40 | 1.2 | 4 | 0.5 | 696 | 697 | 698 | 13 | 701 | 1302 | 3 |
| 41 | 1.2 | 3.9 | 1 | 703 | 701 | 699 | 13 | 701 | 1251 | 3 |
| 42 | 1.2 | 4 | 1.7 | 703 | 702 | 701 | 13 | 701 | 1307 | 3 |
| 43 | 1.2 | 4 | 1 | 900 | 902 | 899 | 17 | — | 1342 | 3 |
| 44 | 3 | 4 | 1 | 903 | 901 | 903 | 25 | 1506 | 1418 | 3 |
| 45 | 5 | 4 | 1 | 900 | 885 | 903 | 31 | 1596 | 1485 | 3 |
| 46 | 10 | 3 | 1 | 900 | 885 | 888 | 25 | 3178 | 3044 | 3 |
| 47 | 10 | 5 | 1 | 879 | 893 | 902 | 54 | 620 | 510 | 5 |
| 48 | 12.5 | 5 | 1 | 899 | 899 | 897 | 67 | 679 | 522 | 5 |
| 49 | 15 | 5 | 1 | 905 | 900 | 900 | 70 | 735 | 560 | 5 |
| 50 | 17.5 | 5 | 1 | 904 | 900 | 902 | 77 | 780 | 603 | 5 |
| 51 | 20 | 5 | 1 | 851 | 862 | 892 | 80 | 879 | 677 | 5 |
| 52 | 21.05 | 5 | 1 | 875 | 878 | 895 | 80 | 894 | 648 | 5 |

A summary of the experimental results of Examples 38–52 is given below in Table 17.

TABLE 17

| Example | Cobalt % | S.A. m²/g |
|---|---|---|
| 38 | 72.4 | 11.2 |
| 39 | 72.5 | 12.2 |
| 40 | 72.8 | 12.6 |
| 41 | 72.6 | 11.9 |
| 42 | 72.3 | 12.5 |
| 43 | 72.6 | 3.9 |

TABLE 17-continued

| Example | Cobalt % | S.A. m²/g |
|---|---|---|
| 44 | 72.9 | 4.1 |
| 45 | 73.1 | 3.9 |
| 46 | 73.2 | 4.7 |
| 47 | 73 | 5.3 |
| 48 | 73.1 | 6 |
| 49 | 72.9 | 4.7 |
| 50 | 73.1 | 5.8 |
| 51 | 72.7 | 6.8 |
| 52 | 72.8 | 6.2 |

Additional analyses of the products of Examples 40, 43, 47 and 51 is given below in Table 18.

TABLE 18

| Example | Co [%] | Surface Area (m²/g) | Crystallite Size [220] in nm | Crystallite Size [311] in nm | CoO [%] | d10 ($\mu$) | d50 ($\mu$) | d90 ($\mu$) |
|---|---|---|---|---|---|---|---|---|
| 40 | 72.8 | 12.6 | 21 | 19 | 0 | 1 | 8.2 | 42.9 |
| 43 | 72.6 | 3.9 | 63 | 69 | 0.4 | 0.9 | 16.8 | 49.1 |
| 47 | 73 | 5.3 | 70 | 65 | 0.6 | 1 | 14.5 | 46.6 |
| 51 | 72.7 | 6.8 | 49 | 48 | 0.4 | 0.9 | 8.8 | 45.2 |

As Examples 38–52 demonstrate, a high quality cobalt oxide powder, with nanometer sized crystallites and agglomerates in the range of 8 to 20 microns, can be produced by the present invention.

Production of Nickel from Nickel Hydroxide

Example 53

The reactor employed in Examples 38–52 was used to carry out the reaction shown below.

$Ni(OH)_2 + H_2 => Ni + 2H_2O$ (Reaction 8)

The $Ni(OH)_2$ feed material was obtained from OMG Kokkola Chemicals Oy. (Kokkola, Finland),.grade NO1, Lot number 1034. This particular material had a d50 particle size of approximately 12.5 microns. The feed material was fed into the vertical transport reactor at a rate of 3 kg/hr. The dispersion gas was nitrogen fed at a rate of 50 liters per minute, and the process gas was hydrogen fed at a rate of 1.0 m³/hr. The dispersion nozzle had a 4 mm inside diameter. The temperatures at all three zones of the VTR were controlled at 500° C.

Example 54

Example 53 was repeated except that the temperatures on all three zones of the VTR was increased to 600° C.

Example 55

Example 53 was repeated except that the temperatures on all three zones of the VTR was increased to 700° C.

Example 56

Example 53 was repeated except that the temperatures on all three zones of the VTR was increased to 800° C.

Example 57

Example 53 was repeated except that the temperatures on all three zones of the VTR was increased to 900° C.

Example 58

Example 53 was repeated except that the temperatures on all three zones of the VTR was increased to 1000° C.

Example 59

Example 55 was repeated except that the process gas feed rate was increased to 1.5 m³hr.

Example 60

Example 54 was repeated except that the process gas feed rate was increased to 1.5 m³/hr.

Example 61

Example 53 was repeated except that the process gas feed rate was increased to 1.5 m³/hr.

Example 62

Example 53 was repeated except that the process gas feed rate was increased to 2.0 m³/hr Example 63

Example 54 was repeated except that the process gas feed rate was increased to 2.0 m³/hr.

Example 64

Example 55 was repeated except that the process gas feed rate was increased to 2.0 m³/hr.

Example 65

Example 63 was repeated except that the feed material was fed into the vertical transport reactor at a rate of 10 kg/hr.

Example 66

Example 63 was repeated except that the feed material was fed into the vertical transport reactor at a rate of 15 kg/hr.

Example 67

Example 63 was repeated except that the feed material was fed into the vertical transport reactor at a rate of 20 kg/hr.

Example 68

Example 65 was repeated except that the process gas feed rate was increased to 2.5 m³/hr. and the dispersion gas was hydrogen fed at 1000 liters per minute. Example 68 demonstrates the use of high concentrations of hydrogen and the use of hydrogen as the dispersing gas produces nickel with a low concentration of oxygen.

A summary of the run conditions for Examples 53–68 is given below in Table 19.

TABLE 19

| Example | Feed | Temp (° C.) | Feed Rate (kg/hr) | Process Gas $H_2$ (m³/hr) | Disperse Gas $N_2$ (l/min) | Nozzle Size (mm) |
|---|---|---|---|---|---|---|
| 53 | $Ni(OH)_2$ | 500 | 3 | 1.0 | 50 | 4 |
| 54 | $Ni(OH)_2$ | 600 | 3 | 1.0 | 50 | 4 |

TABLE 19-continued

| Example | Feed | Temp (°C.) | Feed Rate (kg/hr) | Process Gas H$_2$ (m$^3$/hr) | Disperse Gas N$_2$ (l/min) | Nozzle Size (mm) |
|---|---|---|---|---|---|---|
| 55 | Ni(OH)$_2$ | 700 | 3 | 1.0 | 50 | 4 |
| 56 | Ni(OH)$_2$ | 800 | 3 | 1.0 | 50 | 4 |
| 57 | Ni(OH)$_2$ | 900 | 3 | 1.0 | 50 | 4 |
| 58 | Ni(OH)$_2$ | 1000 | 3 | 1.0 | 50 | 4 |
| 59 | Ni(OH)$_2$ | 700 | 3 | 1.5 | 50 | 4 |
| 60 | Ni(OH)$_2$ | 600 | 3 | 1.5 | 50 | 4 |
| 61 | Ni(OH)$_2$ | 500 | 3 | 1.5 | 50 | 4 |
| 62 | Ni(OH)$_2$ | 500 | 3 | 2.0 | 50 | 4 |
| 63 | Ni(OH)$_2$ | 600 | 3 | 2.0 | 50 | 4 |
| 64 | Ni(OH)$_2$ | 700 | 3 | 2.0 | 50 | 4 |
| 65 | Ni(OH)$_2$ | 600 | 10 | 2.0 | 50 | 4 |
| 66 | Ni(OH)$_2$ | 600 | 15 | 2.0 | 50 | 4 |
| 67 | Ni(OH)$_2$ | 600 | 20 | 2.0 | 50 | 4 |
| 68 | Ni(OH)$_2$ | 600 | 10 | 2.5 | 1000 with H$_2$ | 4 |

A summary of the experimental results of Examples 53–68 is given below in Table 20.

TABLE 20

| Example | Surface Area (m$^2$/g) | FSSS ($\mu$) | d50 ($\mu$) | AD (g/cc) | Carbon (%) | Oxygen (%) | N (%) | S (ppm) |
|---|---|---|---|---|---|---|---|---|
| 53 | 71.40 | 2.20 | — | 0.85 | 0.0 | 0.90 | — | — |
| 54 | — | — | — | — | 0.0 | 0.80 | — | — |
| 55 | — | — | — | — | 0.0 | 2.80 | — | 500 |
| 56 | 1.00 | 6.00 | 37.7 | — | 0.0 | 0.36 | 0.44 | 1700 |
| 57 | 4.50 | — | — | — | 0.0 | 0.50 | 0.46 | 1400 |
| 58 | — | — | — | — | 0.0 | 0.63 | 0.50 | 1100 |
| 59 | — | 4.40 | 31.9 | 1.6 | 0.0 | 0.35 | 0.45 | 2500 |
| 60 | 1.40 | 2.90 | 35.4 | 1.2 | 0.0 | 0.79 | 0.58 | 2300 |
| 61 | — | 2.80 | 40.3 | 1.0 | 0.0 | 1.00 | 0.53 | 2000 |
| 62 | — | — | — | — | 0.0 | 1.10 | — | — |
| 63 | 0.40 | 2.40 | 34.7 | 1.1 | 0.0 | 40.84 | 0.55 | 2200 |
| 64 | — | 4.60 | 33.7 | 1.7 | 0.0 | 0.39 | 0.44 | 1600 |
| 65 | — | — | — | — | 0.1 | >5 | — | — |
| 66 | — | — | — | — | 0.2 | >5 | — | — |
| 67 | — | — | — | — | 0.1 | >5 | — | — |
| 68 | — | 2.20 | 35.2 | 1.5 | 0.0 | 0.95 | <0.1 | 450 |

Examples 53–68 demonstrate the applicability of the present invention to the decomposition and reduction of nickel hydroxide to produce nickel metal powder, and more generally to the decomposition and reduction of metal hydroxides to produce fine metal powders.

Production of Nickel from Nickel Carbonate

Example 69

The reactor employed in Examples 38–68 was used to carry out the reaction shown below.

$NiCO_3 + H_2 => Ni + CO_2 + H_2O$ (Reaction 9)

The NiCO$_3$ feed material was obtained from OMG Kokkola Chemicals Oy. (Kokkola, Finland), grade N50 (N53), Lot number 1024. This particular material had a d50 particle size of approximately 14.0 microns. The feed material was fed into the vertical transport reactor at a rate of 3 kg/hr. The dispersion gas was nitrogen fed at a rate of 30 liters per minute, and the process gas was hydrogen fed at a rate of 1.5 m$^3$/hr. The dispersion nozzle had a 4 mm inside diameter. The temperatures at all three zones of the VTR were controlled at 500° C.

Example 70

Example 69 was repeated except that the temperatures on all three zones of the VTR was increased to 600° C.

Example 71

Example 69 was repeated except that the temperatures on all three zones of the VTR was increased to 700° C.

Example 72

Example 69 was repeated except that the temperatures on all three zones of the VTR was increased to 800° C. and the process gas feed rate was decreased to 1.0 m$^3$/hr.

Example 73

Example 72 was repeated except that the temperatures on all three zones of the VTR was increased to 900° C.

Example 74

Example 72 was repeated except that the temperatures on all three zones of the VTR was increased to 1000° C. and the dispersion gas feed rate was increased to 30 liters per minute.

Example 75

Example 69 was repeated except that the process gas feed rate was increased to 2.0 m$^3$/hr. and the dispersion gas feed was increased to 50 liters per minute.

Example 76

Example 75 was repeated except that the process gas feed rate was increased to 2.5 m$^3$/hr.

Example 77

Example 75 was repeated except that the temperatures on all three zones of the VTR were increased to 550° C. and the process gas feed rate was decreased to 1.5 m$^3$/hr.

Example 78

Example 77 was repeated except that the process gas feed rate was increased to 2.0 m$^3$/hr.

Example 79

Example 77 was repeated except that the process gas feed rate was increased to 2.5 m$^3$/hr. and the inside diameter of the dispersion nozzle was reduced to 3 mm.

Example 80

Example 69 was repeated except that the process gas feed rate was increased to 2.0 m$^3$/hr. and the inside diameter of the dispersion nozzle was reduced to 3 mm.

Example 81

Example 80 was repeated except that the process gas feed rate was increased to 2.5 m$^3$/hr.

Example 82

Example 81 was repeated except that the temperatures on all three zones of the VTR was increased to 550° C. and the process gas feed rate was decreased to 1.5 m$^3$/hr.

Example 83

Example 82 was repeated except that the process gas feed rate was increased to 2.0 m$^3$/hr.

Example 84

Example 82 was repeated except that the process gas feed rate was increased to 2.5 m³/hr.

A summary of the run conditions for Examples 69–84 is given below in Table 21.

TABLE 21

| Example | Feed | Temp (° C.) | Feed Rate (kg/hr) | Process Gas H2 (m³/hr) | Disperse Gas N2 (l/min) | Nozzle Size (mm) |
|---|---|---|---|---|---|---|
| 69 | NiCO₃ | 500 | 3 | 1.5 | 30 | 4 |
| 70 | NiCO₃ | 600 | 3 | 1.5 | 30 | 4 |
| 71 | NiCO₃ | 700 | 3 | 1.5 | 30 | 4 |
| 72 | NiCO₃ | 800 | 3 | 1.0 | 30 | 4 |
| 73 | NiCO₃ | 900 | 3 | 1.0 | 30 | 4 |
| 74 | NiCO₃ | 1000 | 3 | 1.0 | 30 | 4 |
| 75 | NiCO₃ | 500 | 3 | 2.0 | 50 | 4 |
| 76 | NiCO₃ | 500 | 3 | 2.5 | 50 | 4 |
| 77 | NiCO₃ | 550 | 3 | 1.5 | 50 | 4 |
| 78 | NiCO₃ | 550 | 3 | 2.0 | 50 | 4 |
| 79 | NiCO₃ | 550 | 3 | 2.5 | 50 | 3 |
| 80 | NiCO₃ | 500 | 3 | 2.0 | 30 | 3 |
| 81 | NiCO₃ | 500 | 3 | 2.5 | 30 | 3 |
| 82 | NiCO₃ | 550 | 3 | 1.5 | 30 | 3 |
| 83 | NiCO₃ | 550 | 3 | 2.0 | 30 | 3 |
| 84 | NiCO₃ | 550 | 3 | 2.5 | 30 | 3 |

A summary of the experimental results of Examples 69–84 is given below in Table 22.

TABLE 22

| Example | Surface Area (m²/g) | FSSS (μ) | d50 (μ) | AD (g/cc) | Carbon (%) | Oxygen (%) | N (%) | S (ppm) |
|---|---|---|---|---|---|---|---|---|
| 69 | 7.50 | 2.20 | 20.6 | 0.8 | 0.1 | 1.20 | 0.35 | 340 |
| 70 | 1.70 | 3.50 | 17.3 | 1.2 | 0.0 | 0.32 | 0.30 | 370 |
| 71 | 1.40 | 2.40 | 18.9 | 1.2 | 0.0 | 0.26 | 0.39 | 270 |
| 72 | 1.00 | 4.20 | 26.3 | 1.1 | 0.0 | 0.40 | 0.32 | 380 |
| 73 | 0.80 | 4.80 | 41.6 | 0.9 | 0.0 | 0.66 | 0.29 | 360 |
| 74 | 0.50 | — | — | — | 0.0 | 1.40 | 0.27 | 260 |
| 75 | — | — | — | 0.95 | 0.1 | 0.77 | 1.40 | 380 |
| 76 | — | — | — | — | — | 3.90 | 1.90 | — |
| 77 | — | — | — | — | — | 2.20 | 2.50 | — |
| 78 | 6.50 | 3.00 | — | 0.95 | 0.1 | 0.36 | 0.56 | 320 |
| 79 | 4.30 | 3.10 | — | 0.95 | 0.1 | 0.61 | 1.00 | 440 |
| 80 | 1.50 | — | — | — | 0.1 | 1.60 | 0.68 | 130 |
| 81 | — | — | — | — | — | 3.60 | — | — |
| 82 | 3.8 | 3 | 18.5 | 0.81 | 0.0 | 0.59 | — | 120 |
| 83 | 1.6 | 3 | 18.5 | 0.83 | 0.0 | 0.81 | — | 80 |
| 84 | — | 3.3 | 18.6 | 0.78 | 0.1 | 1.80 | — | — |

Examples 69–84 demonstrate the applicability of the present invention to the decomposition and reduction of nickel carbonate to produce nickel metal powder, and more generally to the decomposition and reduction of metal carbonates to produce fine metal powders.

Examples 69–84 also demonstrate that the surface area can be controlled by controlling the reaction temperature. For example, scanning electron microscopy (SEM) photomicrographs of the product of Example 69 showed overall agglomerates approximately 15 to 20 microns in diameter. The agglomerates were composed of crystallites that were less than 100 nm in diameter. SEM photomicrographs of the product of Example 74 showed overall agglomerates approximately 30 microns in diameter. The crystallites that made up the agglomerates were approximately 1 to 1.5 microns in diameter.

The following examples 85–87 all were conducted using a Thermal Technology Model 1000-45180-FP60 Astro™ vertical graphite-tube reactor available from Thermal Technology, Inc. (Santa Rosa, Calif.)The furnace tube was 91.44 cm in length with a 45.72 cm hot zone in the center. The inner diameter was 8.89 cm. A particle feeder connected at its outlet into a 0.3175 cm inside diameter stainless steel tube which in turn connected to a water-cooled, copper lance in the top of the reactor that ended at the top of the reactor hot zone. To prevent any dead space, the gap between the water-cooled lance and the inner graphite tube was plugged with a piece of graphite. The graphite plug ended at the lance end at the top of the hot zone. A purge stream of diluent nitrogen gas entered the tube reactor between the lance and the graphite plug.

Particulate feed material was entrained in argon gas at the outlet of the particle feeder and the dispersion flowed to the hot zone of the reactor furnace tube. After exiting the hot zone of the reactor, the gaseous dispersion flowed into a cooling zone consisting of a water-cooled aluminum tube that was 29.85 cm long and had an inner diameter of 16.51 cm. This expanded section slowed the velocity of the particles and cooled them. Particles were collected in a stainless steel vessel at the outlet of the cooling zone. The stainless steel vessel was purged with an additional 3.00 liters per minute of $N_2$ to continue cooling and prevent further reaction. The effluent gas from the vessel flowed through a filter to collect any residual powder retained in the gas.

The operation of this rapid heating reactor was similar to that described in U.S. Pat. No. 5,110,565, previously incorporated herein by reference.

The products of Examples 85–87 were analyzed to determine their composition and surface area. Nickel metal contents were measured by X-ray diffraction. Oxygen contents were measured by the ASTM E1019 standard using an oxygen analyzer manufactured by LECO Corporation (St. Josephs, Mich.). Surface area was measured by BET based on nitrogen absorption on the surface following the ASTM D4567 standard.

Nickel Metal Powder from Nickel Oxalate

Example 85

20.24 grams of nickel oxalate dihydrate ($NiC_2O_4 \cdot 2H_2O$) (obtained from All-Chemie, Mt. Peasant, S.C.) were dehydrated by heating it to 200° C.±10° C. and holding it for 6 hours in a tube furnace under flowing $N_2$ This heat treatment removed 3.36 grams of water thus reducing the amount of water later entering the hot graphite reactor. This partially dehydrated powder was stored in a standard vacuum desiccator until used.

The particle feeder to the vertical graphite tube reaction furnace was filled with 6.9 grams of the partially dehydrated nickel oxalate dihydrate. The powder was entrained at the outlet from the feeder in an argon gas stream flowing at 3.76 liters per minute. A purge stream of diluent nitrogen gas entered the tube reactor between the lance and the graphite plug. The entrained particles flowed at a rate of 0.75 grams per minute into the hot zone of the reactor furnace that had been heated to a temperature of 1000° C. The particles had a residence time of 3.6 seconds.

The powders collected were analyzed for composition by X-ray diffraction and the LECO oxygen analyzer. The X-ray diffraction confirmed that the only crystalline species present is nickel metal and that the product is fine nickel metal powder. The BET measurement showed the nickel powder has a surface area of 14 m²/g.

This example indicates that nickel oxalate dihydrate ($NiC_2O_4 \cdot 2H_2O$) can be decomposed in seconds to produce ultra-fine nickel metal powder by the present invention.

Example 86

Example 85 was repeated, except that 8.9 grams of the same partially dehydrated nickel oxalate dihydrate of Example 85 was reacted to nickel metal, the entraining argon gas flow was 4.35 liters per minute, the diluent nitrogen gas purge flow was 3.00 l/min., the furnace temperature was 500° C., and the particle residence time was 5.5 seconds. The product collected was analyzed. X-ray diffraction showed that the only crystalline product is nickel metal. The BET measurement indicated that the nickel powder has a surface area of 8.6 $m^2/g$.

Example 87

Example 85 was repeated, except that 8.9 grams of nickel oxalate dihydrate—partially dehydrated the same as in Example 85—was reacted to nickel metal, the entraining argon gas flow was 4.35 liters per minute, the diluent nitrogen gas purge flow was 1.50 liters per minute, the furnace temperature was 750° C., and the particle residence time was 5.5 seconds.

The product was collected and analyzed by X-ray diffraction and BET. The X-ray diffraction showed that the only crystalline product is nickel metal. The BET measurement indicated that the nickel powder has a surface area of 2.1 $m^2/g$.

The following examples 88–103 all were conducted using a Theta Gravitronic VII thermogravimetric analyzer (TGA) available from Theta Corporation (Port Washington, N.Y.). The TGA consisted of a high temperature graphite furnace with a hot zone of 10.5 cm in length and an inner diameter of 4.06 cm., a Cahn D-1000 microbalance, and gas flow and temperature control equipment. A cylindrical, alumina crucible with an inner diameter of 1.6 cm and a height of 2.54 cm was suspended from the balance into the hot zone of the furnace using a platinum wire.

The products of Examples 88–103 were analyzed to determine their composition and surface area. Nickel metal contents, oxygen contents, carbon contents, and surface area were measured by the same methods of Examples 85–87. Some products were analyzed for particle size by taking images by transmission electron microscopy (TEM).

Nickel Metal from Nickel Oxalate

Example 88

1.54 g nickel oxalate dihydrate (same as Example 85, but not partially dehydrated) were placed in the alumina crucible of the TGA. The furnace was sealed to ambient gases and purged of air. An argon flow rate of 0.5 liters per minute was maintained throughout this experiment to remove the $CO_2$ produced in the reaction. The furnace was heated at 5° C./min up to 400° C., then cooled to 15° C. at 30° C./min. The sample was held at room temperature under argon flow for at least 2 hours to fully cool. A 68 percent mass loss was recorded by the TGA. This mass loss corresponds theoretically to complete conversion of nickel oxalate dihydrate to nickel metal. The sample was removed and analyzed by X-ray diffraction and BET. The X-ray diffraction showed that the only crystalline substance is nickel metal. The BET surface area was 13 $m^2/g$.

This example indicates that nickel metal can be synthesized from the decomposition of nickel oxalate dihydrate at 400° C. by the present invention.

Example 89

Example 88 was repeated except that 2.194 grams of nickel oxalate dihydrate was reacted to nickel metal. An argon flow rate of 0.5 liters per minute was maintained throughout the experiment. The furnace was heated at 10° C./min up to 500° C., then cooled to 15° C. at 30° C./min. A 68 percent mass loss was recorded by the TGA. This corresponds to complete conversion to nickel metal. The sample was removed and analyzed. The X-ray diffraction showed that the only crystalline substance is nickel metal. LECO measurements showed a 0.19 wt % carbon and 1.73 wt % oxygen content. The TEM images indicated that the particles average 200 nm diameter and are comprised of 10 nm primary particles.

This example demonstrates that nano-sized nickel primary particles can be synthesized from the decomposition of nickel oxalate dihydrate by the present invention and that these particles have a residual oxygen content of less than 1.8 wt %.

Cobalt Metal from Cobalt Oxalate

Example 90

Example 88 was repeated except that 2.2657 grams of cobalt oxalate was reacted to form cobalt metal in a 0.8 liter per minute stream of 10% $H_2$ in an argon atmosphere. The furnace was heated at 30° C./min to a temperature of 750° C. A 68 percent mass loss was recorded by the TGA. This corresponds to complete conversion to cobalt metal. X-ray diffraction showed that the only crystalline species present is cobalt metal.

Tin Metal from Tin Oxalate

Example 91

Example 88 was repeated except that 0.796 grams of tin oxalate was reacted to form tin metal in a stream of 10% $H_2$ in an argon atmosphere. The furnace was heated at 30° C./min to a temperature of 375° C. A 42 percent mass loss was recorded by the TGA balance. This corresponds to complete conversion of the oxalate to the base metal. BET indicated that the surface area is 10 $m^2/g$ (10 nm). X-ray diffraction showed that the only crystalline species present is tin metal.

Lead Metal form Lead Oxalate

Example 92

Example 88 was repeated except that 1.6131 grams of lead oxalate was reacted to form lead metal in a stream of 0.5 liters per minute of argon. The furnace was heated at 30° C./min to a temperature of 375° C. The TGA balance recorded a 27 percent mass loss. This corresponds to complete conversion of the oxalate to the base metal. X-ray diffraction showed that the only crystalline species present is lead metal.

Nickel Metal from Nickel Carbonate

Example 93

Example 88 was repeated except that 1.3054 grams of nickel carbonate was reacted to form nickel metal in a 1.3 liter per minute stream of 10% hydrogen in argon. The furnace was heated at 30° C./min to a temperature of 275° C. A 51 percent mass loss was recorded by the TGA balance.

Cobalt Metal from Cobalt Carbonate

Example 94

Example 88 was repeated except that 1.6427 grams of cobalt carbonate was reacted to form cobalt metal in a 0.8 liter per minute stream of 10% hydrogen in argon. The furnace was heated at 30° C./min to a temperature of 900° C. A 50 percent mass loss was recorded by the TGA balance. This corresponds to complete conversion of the carbonate to the base metal. BET indicated that the surface area is 1.2 m$^2$/g. X-ray diffraction showed that the only crystalline species present is cobalt metal.

Nickel Metal from Nickel Hydroxide

Example 95

Example 88 was repeated except that 1.5414 grams of nickel hydroxide was reacted to form nickel metal in a 0.8 liter per minute stream of 10% hydrogen in argon. The furnace was heated at 30° C./min to a temperature of 900° C. A 40 percent mass loss was recorded by the TGA balance. This corresponds to complete conversion of the hydroxide to the base metal. X-ray diffraction showed that the only crystalline species present is nickel metal.

Cobalt Metal from Cobalt Hydroxide

Example 96

Example 88 was repeated except that 1.2908 grams of cobalt hydroxide was reacted to form cobalt metal in a 1.3 liter per minute stream of 5% hydrogen in argon atmosphere. The furnace was heated at 30° C./min to a temperature of 575° C. A 39 percent mass loss was recorded by the TGA balance. This corresponds to complete conversion of the hydroxide to the base metal. X-ray diffraction showed that the only crystalline species present is cobalt metal.

Cobalt Metal from Cobalt Acetate Tetrahydrate

Example 97

Example 88 was repeated except that 1.973 grams of cobalt acetate tetrahydrate was reacted to form cobalt metal in a 2.3 liter per minute stream of 2% hydrogen in argon atmosphere. The furnace was heated at 30° C./min to a temperature of 400° C. A 74 percent mass loss was recorded by the TGA balance. This corresponds to complete conversion of the acetate to cobalt metal. BET indicated that the surface area is 14 m$^2$/g. X-ray diffraction showed that the only crystalline species present is cobalt metal.

Cerium Oxide ($Ce_7O_{12}$) from Cerium Oxalate

Example 98

Example 88 was repeated except that 2.2847 grams of cerium oxalate nonahydrate (9H$_2$O) was reacted to form cerium oxide in a 0.8 liter per minute stream of 10% hydrogen in argon. The furnace was heated at 30° C./min to a temperature of 800° C. A 51 percent mass loss was recorded by the TGA balance. This corresponds to complete conversion of the oxalate nonahydrate into the oxide. X-ray diffraction showed that the only crystalline species is cerium oxide. BET indicated that the surface area is 7.6 m$^2$/g.

Cerium Oxide ($CeO_2$) from Cerium Carbonate

Example 99

Example 88 was repeated except that 2.1834 grams of cerium carbonate pentahydrate (5 H$_2$0) was reacted to form cerium oxide in a 0.8 liter per minute stream of argon. The furnace was heated at 30° C./min to a temperature of 800° C. A 38 percent mass loss was recorded by the TGA balance. This corresponds to complete conversion of the oxalate pentahydrate into the oxide. X-ray diffraction showed that the only crystalline species is cerium oxide.

Cerium Oxide ($CeO_2$) from Cerium Hydroxide

Example 100

Example 88 was repeated except that 2.4407 grams of cerium hydroxide was reacted to form cerium oxide in a 0.8 liter per minute stream of argon. The furnace was heated at 30° C./min to a temperature of 800° C. A 6 percent mass loss was recorded by the TGA balance. This corresponds to 33% conversion of the oxalate into the oxide. X-ray diffraction showed that the only crystalline species is cerium oxide.

Lanthanum Oxide ($La_2O_3$) from Lanthanum Oxalate

Example 101

Example 88 was repeated except that 1.8693 grams of lanthanum oxalate hydrate was reacted to form lanthanum oxide in a 0.8 liter per minute stream of 10% hydrogen in argon. The furnace was heated at 30° C./min. to a temperature of 800° C. A 50 percent mass loss was recorded by the TGA balance. This corresponds to complete conversion of the oxalate hexahydrate into the oxide. X-ray diffraction showed that the only crystalline species is lanthanum oxide. BET indicated that the surface area is 2.2 m$^2$/g.

Neodymium Oxide ($Nd_2O_3$) from Neodymium Oxalate ($Nd_2(C_2O_4)_3 \cdot 16H_2O$)

Example 102

Example 88 was repeated except that 1.4360 grams of neodymium oxalate hydrate was reacted to form neodymium oxide in a 0.8 liter per minute stream of argon. The furnace was heated at 30° C./min to a temperature of 800° C. A 60 percent mass loss was recorded by the TGA balance. This corresponds to complete conversion of the oxalate into the oxide. X-ray diffraction showed that the only crystalline species is neodymium oxide. BET indicated that the surface area is 2.5 m$^2$/g.

Neodymium Oxide ($Nd_2O_3$) from Neodymium Carbonate ($Nd_2(CO_3)_3 \cdot 9H_2O$)

Example 103

Example 88 was repeated except that 2.1834 grams of neodymium carbonate hydrate was reacted to form neodymium oxide in a 0.8 liter per minute stream of 10% hydrogen in argon. The furnace was heated at 30° C./min to a temperature of 800° C. A 46 percent mass loss was recorded by the TGA balance. This mass loss corresponds to complete conversion of the oxalate into the oxide. X-ray diffraction showed that the only crystalline species is neodymium oxide.

What is claimed is:

1. A method for converting a metal-containing or metal alloy-containing compound to form the metal of the metal-containing compound or the metal alloy of the metal alloy-containing compound, comprising:

feeding the metal-containing or metal alloy-containing compound substantially axially into a reaction chamber, heating the metal-containing or metal alloy-containing compound at a rate of between about 100° C./second to about 100,000,000° C./second to an elevated temperature that makes the conversion of the metal-containing or the metal alloy-containing compound thermodynamically favorable, but is less than the melting point of the metal or metal alloy, and holding the metal-containing compound at the elevated temperature for a residence time sufficient to convert the metal-containing or metal alloy-containing compound into at least the metal of the metal-containing compound or the metal alloy of the metal alloy-containing compound; wherein the metal-containing or metal alloy-containing compound travels substantially axially through the reaction chamber.

2. The method of claim 1, wherein the residence time is from about 0.1 to about 60 seconds.

3. The method of claim 1, wherein the conversion is by decomposition.

4. The method of claim 1, wherein the conversion is by reduction.

5. The method of claim 1, wherein the conversion is by substantially simultaneous decomposition and reduction.

6. The method of claim 1, wherein the residence time is from about 0.1 second to about 60 seconds.

7. The method of claim 1, wherein the residence time is from about 0.2 seconds to about 10 seconds.

8. The method of claim 1, wherein the heating rate is from about 100,000 to about 1,000,000° C./second.

9. The method of claim 1, wherein the heating rate is from about 1,000 to about 1,000,000° C./second.

10. The method of claim 1, wherein the heating rate is from about 10,000 to about 100,000° C./second.

11. A method for converting a metal-containing or metal alloy-containing compound to form the metal of the metal-containing compound or the metal alloy of the metal alloy-containing compound, comprising:

heating the metal-containing or metal alloy-containing compound at a rate of between about 100° C./second to about 100,000,000° C./second to an elevated temperature that makes the conversion of the metal-containing or metal alloy-containing compound thermodynamically favorable, but is less than the melting point of the metal or metal alloy;

holding the metal-containing or metal alloy-containing compound at the elevated temperature for a residence time sufficient to convert a portion of the metal-containing or metal alloy-containing compound into at least one precursor of the metal of the metal-containing compound or the metal alloy of the metal alloy-containing compound;

heating the precursor to a second elevated temperature that makes the conversion of the precursor thermodynamically favorable, but is less than the melting point of the metal or metal alloy; and holding the precursor at the second elevated temperature to convert substantially all of the precursor into at least the metal of the metal-containing compound or the metal alloy of the metal alloy-containing compound.

12. A method for converting a metal-containing or metal alloy-containing compound to form the metal of the metal-containing compound or the metal alloy of the metal alloy-containing compound, comprising:

heating the metal-containing or metal alloy-containing compound at a rate of between about 100° C./second to about 100,000,000° C./second to an elevated temperature that makes the conversion of the metal-containing or metal alloy-containing compound thermodynamically favorable, but is less than the melting point of the metal or metal alloy;

holding the metal-containing or metal alloy-containing compound at the elevated temperature for a residence time sufficient to convert the metal-containing or the metal alloy-containing compound into at least one precursor metal-containing or metal alloy-containing compound;

heating the precursor metal-containing or metal alloy-containing compound to a second elevated temperature that makes the conversion of the precursor metal-containing or metal-alloy containing compound thermodynamically favorable, but is less than the melting point of the metal or metal alloy; and holding the precursor metal-containing or metal alloy-containing compound at the second elevated temperature to convert substantially all of the precursor metal-containing or metal alloy-containing compound into the metal or the precursor metal alloy-containing compound into the metal alloy.

13. A method for converting an oxalate selected from the group consisting of the Group VIII, Group IVA, Group IVB, Group VB, Group VIB metals, and combinations thereof, to form the metal or metal alloy of the metallic oxalate comprising:

heating the metallic oxalate in a substantially non-oxidizing atmosphere at a rate of between about 100° C./second to about 100,000,000° C./second to an elevated temperature that makes the conversion of the metallic oxalate thermodynamically favorable, but is less than the melting point of the metallic oxalate, and holding the metallic oxalate at the elevated temperature for a residence time sufficient to convert the metallic oxalate into at least the metal of the metallic oxalate or the metal alloy of the metallic oxalate.

14. The method of claim 13, wherein the metal is selected from the group consisting of nickel, cobalt, lead and tin.

15. The method of claim 14, wherein the elevated temperature is between approximately 600° C. and 1300° C.

16. The method of claim 14, wherein the residence time is from about 0.1 second to about 30 minutes.

17. The method of claim 14, wherein the residence time is from about 0.1 second to about 30 seconds.

18. The method of claim 14, wherein the residence time is from about 0.1 second to about 10 seconds.

19. The method of claim 13, wherein the metallic oxalate is an oxalate of Ni, Co, Fe, Sn, Pb, Hf, Ta, Cr or W or combinations thereof.

* * * * *